(12) United States Patent
Singh

(10) Patent No.: US 9,819,572 B2
(45) Date of Patent: Nov. 14, 2017

(54) MULTIPLE RING IDENTIFICATION AND CONFIGURATION PROTOCOL

(71) Applicant: Brocade Communications Systems, Inc., San Jose, CA (US)

(72) Inventor: Mritiyunjay Kumar Singh, Bangalore (IN)

(73) Assignee: Brocade Communications Systems, Inc., San Jose, CA (US)

( * ) Notice: Subject to any disclaimer, the term of this patent is extended or adjusted under 35 U.S.C. 154(b) by 10 days.

(21) Appl. No.: 14/832,874

(22) Filed: Aug. 21, 2015

(65) Prior Publication Data

US 2016/0119220 A1 Apr. 28, 2016

Related U.S. Application Data

(63) Continuation of application No. 13/954,861, filed on Jul. 30, 2013, now Pat. No. 9,148,346.

(60) Provisional application No. 61/697,207, filed on Sep. 5, 2012.

(51) Int. Cl.
| | | |
|---|---|---|
| *H04L 12/751* | (2013.01) | |
| *H04L 12/24* | (2006.01) | |
| *H04L 12/46* | (2006.01) | |
| *H04L 12/42* | (2006.01) | |
| *H04L 12/721* | (2013.01) | |

(52) U.S. Cl.
CPC .......... *H04L 45/02* (2013.01); *H04L 12/4641* (2013.01); *H04L 41/12* (2013.01); *H04L 45/26* (2013.01); *H04L 2012/421* (2013.01)

(58) Field of Classification Search
CPC .......... H04L 12/42; H04L 12/422; H04J 3/085
See application file for complete search history.

(56) References Cited

U.S. PATENT DOCUMENTS

| | | |
|---|---|---|
| 6,330,229 B1 | 12/2001 | Jain et al. |
| 6,717,922 B2 | 4/2004 | Hsu et al. |
| 7,209,435 B1 | 4/2007 | Kuo et al. |

(Continued)

OTHER PUBLICATIONS

Final Office Action dated Apr. 25, 2016, for U.S. Appl. No. 14/018,741, filed Sep. 5, 2013, 34 pages.

(Continued)

*Primary Examiner* — Benjamin H Elliott, IV
(74) *Attorney, Agent, or Firm* — Kilpatrick Townsend & Stockton LLP

(57) ABSTRACT

A protocol identifies and configures rings in a network topology automatically in order to simplify and quicken the actions that need to be performed in response to addition, deletion and shuffle of network nodes in that topology. Such rings do not need to be identified and configured manually. The protocol involves two separate sequentially performed phases. In the first phase, the protocol can automatically identify all rings that are present within a Virtual Local Area Network (VLAN) topology. In the second phase, the protocol can automatically configure each node of each such ring in conformity with the Ethernet Ring Protection (ERP) protocol. After this ERP configuration has been performed, the failure of a link within the network will not require every network node to re-learn paths through the network; instead, the nodes that are required to re-learn such paths can be limited to those within the particular ring that contained the failed link.

20 Claims, 23 Drawing Sheets

(56) References Cited

U.S. PATENT DOCUMENTS

| | | | |
|---|---|---|---|
| 7,558,205 B1 | 7/2009 | Moncada-Elias et al. | |
| 7,822,049 B1 | 10/2010 | Moncada-Elias et al. | |
| 8,699,380 B2 | 4/2014 | Kapitany et al. | |
| 9,148,346 B2* | 9/2015 | Singh | |
| 2005/0185954 A1* | 8/2005 | Sadananda | H04B 10/032 398/5 |
| 2007/0047471 A1 | 3/2007 | Florit et al. | |
| 2008/0267081 A1* | 10/2008 | Roeck | H04L 47/10 370/249 |
| 2010/0177658 A1 | 7/2010 | Arai et al. | |
| 2010/0208623 A1* | 8/2010 | Kano | H04L 12/42 370/258 |
| 2011/0019536 A1 | 1/2011 | Kim et al. | |
| 2011/0044162 A1 | 2/2011 | Ryoo et al. | |
| 2011/0044166 A1* | 2/2011 | Lee | H04L 12/437 370/223 |
| 2011/0158241 A1 | 6/2011 | Wang et al. | |
| 2011/0292833 A1 | 12/2011 | Kapitany et al. | |
| 2012/0170487 A1 | 7/2012 | Wu | |
| 2012/0317138 A1 | 12/2012 | Kitaichi et al. | |
| 2013/0177021 A1* | 7/2013 | Kitayama | H04L 12/423 370/392 |
| 2014/0064060 A1 | 3/2014 | Kulambi | |
| 2014/0064061 A1 | 3/2014 | Kulambi | |
| 2015/0036544 A1 | 2/2015 | Singh | |
| 2015/0036546 A1 | 2/2015 | Singh | |
| 2016/0119220 A1* | 4/2016 | Singh | H04L 41/12 370/255 |

OTHER PUBLICATIONS

Notice of Allowance, dated May 13, 2016, for U.S. Appl. No. 14/018,713, filed Sep. 5, 2016, 6 pages.

U.S. Appl. No. 14/018,741, filed Sep. 5, 2013 by Kulambi. (Unpublished.).

U.S. Appl. No. 14/018,713, filed Sep. 5, 2013 by Kulambi. (Unpublished.).

U.S. Appl. No. 13/954,861, filed Jul. 30, 2013 by Singh. (Unpublished.).

U.S. Appl. No. 13/954.867, filed Jul. 30. 2013 by Singh. (Unpublished.).

Non-Final Office Action, dated Jun. 25, 2015, for U.S. Appl. No. 14/018,713, filed Sep. 5, 2013, 12 pages.

Notice of Allowance, dated May 6, 2015, for U.S. Appl. No. 13/954.861, filed Jul. 30, 2013, 21 pages.

Non-Final Office Action, dated Jun. 2, 2015, for U.S. Appl. No. 13/954,867, filed Jul. 30, 2013, 21 pages.

Non-Final Office Action, dated Aug. 18, 2015, for U.S. Appl. No. 14/018,741, filed Sep. 5, 2013, 32 pages.

Notice of Allowance, dated Aug. 31, 2015, for U.S. Appl. No. 13/954,861, filed Jul. 30, 2013, 4 pages.

Notice of Allowance, dated Dec. 23, 2015, for U.S. Appl. No. 13/954,867, filed Jul. 30, 2013, 14 pages.

Final Office Action dated Jan. 13, 2016, for U.S. Appl. No. 14/018,713, filed Sep. 5, 2013, 13 pages.

"Carrier Ethernet," Brocade, accessed Sep. 12, 2013 at http://www.brocade.com/solutions-technology/service-provider/carrier-ethernet/index.page, 3 pages.

"Ethernet ring protection switching," Recommendation ITU-T G.8032/Y.1344, International Telecommunication Union, Feb. 2012, 104 pages.

"Ethernet Ring Protection Switching," Wikipedia, accessed Sep. 12, 2013 at http://en.wikipedia.org/wiki/Ethernet_Ring_Protection_Switching, 3 pages.

"G.8032 Ethernet Ring Protection Overview," International Telecommunication Union, Mar. 2008, 23 pages.

Lee et al., "Flush Optimizations to Guarantee Less Transient Traffic in Ethernet Ring Protection," ETRI Journal, vol. 32, No. 2, Apr. 2010, pp. 184-194.

Parker, "White Paper. Metro Ring Protocol (MRP)", © 2002 Foundry Networks, Inc., Apr. 2002, 6 pages (in color).

Notice of Allowance, dated Sep. 19, 2017, for U.S. Appl. No. 14/018,741, filed Sep. 5, 2013, 15 pages.

\* cited by examiner

MULTIPLE RING IDENTIFICATION AND CONFIGURATION PROTOCOL

CROSS-REFERENCES TO RELATED APPLICATIONS

The present application is a continuation of U.S. application Ser. No. 13/954,861, filed Jul. 30, 2013, titled MULTIPLE RING IDENTIFICATION AND CONFIGURATION PROTOCOL, which claims the benefit and priority under 35 U.S.C. 119(e) of U.S. Provisional Application No. 61/697,207 filed Sep. 5, 2012, titled MULTIPLE RING IDENTIFICATION AND CONFIGURATION PROTOCOL. The entire contents of the Ser. No. 13/954,861 and 61/697,207 applications are incorporated herein by reference for all purposes.

BACKGROUND

The disclosure herein pertains generally to the field of computer networks. In a network, nodes interconnected by links can learn paths from various sources to various destinations over time. As these nodes learn such paths, the nodes can update internally stored tables in order to specify, for a data packet having a particular destination, the port on which that data packet should be forwarded. When a link fails after such paths have been learned, at least some paths may need to be re-learned in order to compensate for the fact that paths containing the failed link are no longer viable; alternative paths will need to be learned in those cases.

The re-learning of paths following link failure can take a substantial amount of time, which is detrimental to the data-path switching performance within the network. Fortunately, the configuration of nodes using a protocol called Ethernet Ring Protection (ERP) protocol can somewhat simplify and quicken the re-learning process by confining relearning only over ring nodes of one ring. Unfortunately, configuring nodes to use ERP has traditionally been a manual task that can be time-intensive and error-prone, especially when a network contains many nodes configured with many VLANs. The configuration typically requires a human being to identify rings within the network topology manually, and to designate certain nodes and ports within each ring manually. When a vlan port membership changes after addition or removal or shuffle of network devices, this usually means that a human being will need to manually identify rings again and modify existing ERP configuration over affected network nodes. If a big VLAN topology changes with great frequency, the resulting frequent manual analysis and re-configuration in response to every single vlan-port membership change can become burdensome for a person to perform. It also increases the probability of manual misconfiguration which adversely affects data traffic.

SUMMARY

Techniques disclosed herein can be used to identify and configure logical rings in a network topology automatically in order to simplify and quicken the actions that need to be performed in response to any addition or removal of network devices within that topology. As a consequence of the technique, such rings do not need to be identified and configured manually—a task that can be both time-consuming and error-prone when performed by a human. In an embodiment, the techniques can be performed through the operation of a protocol that involves two separate sequentially performed phases. In the first phase, the protocol can automatically identify all rings that are present within a Virtual Local Area Network (VLAN) topology. In the second phase, the protocol can automatically load each ring node with appropriate configuration in conformity with the Ethernet Ring Protection (ERP) protocol. After this ERP configuration of each node has been performed, the failure of a link within the network will not require every network node to re-learn paths through the network; instead, the nodes that are required to re-learn such paths can be limited to those within the particular ring that contained the failed link. The protocol referred herein as Multiple Ring Identification and Configuration Protocol (MRICP).

FIG. 16 is a block diagram that illustrates different ring types to which various embodiments of the invention can be applied. In FIG. 16, segments of a major ring are shown as heavy lines, while segments of a sub ring are shown as light lines, while segments of a non-ring are shown as dotted lines. Network devices A through K are shown. The first phase of MRICP is responsible for identification of rings. First phase can logically separate the network topology into major rings, sub-rings, and non-rings. Major ring is a circular path. Example of major rings in FIG. 16 are ring 2, which includes devices C, D, J, and K; and ring 4, which includes devices E, F, G, and H. Sub-ring is a non-circular path which includes at least one path between its end nodes other than the path within the ring itself. An example of a sub-ring in FIG. 16 is ring 1, which includes devices K, A, B, and C. Non-ring is a non-circular path that includes no path between its end nodes other than the path within the ring itself. An example of a non-ring is path 3, which includes devices H, I, and J. The automatic ring identification performed as part of MRICP involves assignment of a ring id to each port of network nodes. A conflict resolution process can be performed during this assignment in order to ensure, for each ring in the network, the ports of the nodes involved within that ring are configured to have the same ring identifier by the conclusion of the first phase. The discovery and configuration of rings performed in this manner can be performed in a particular VLAN context.

DETAILED DESCRIPTION

Embodiments of the invention include MRICP, which can be used to automatically identify and configure multiple Ethernet Protocol Ring (ERP) rings within a network topology. The configuration performed by MRICP can make the network topology loop-free. MRICP can automatically identify both ERP major rings and ERP sub-rings. The configuration can involve configuring each ring to have an ERP Resource Protection Link (RPL) owner and an RPL port. The configuration can involve configuring both left and right interfaces for each node within each ring within the topology. All of the above can be performed within a particular VLAN context. Additionally, after initial configuration has been performed across the topology, MRICP can compensate for changes in the topology that might occur due to the addition or removal of nodes or links from the topology. MRICP can automatically adjust ring configurations in response to such topological changes.

Figure 1:
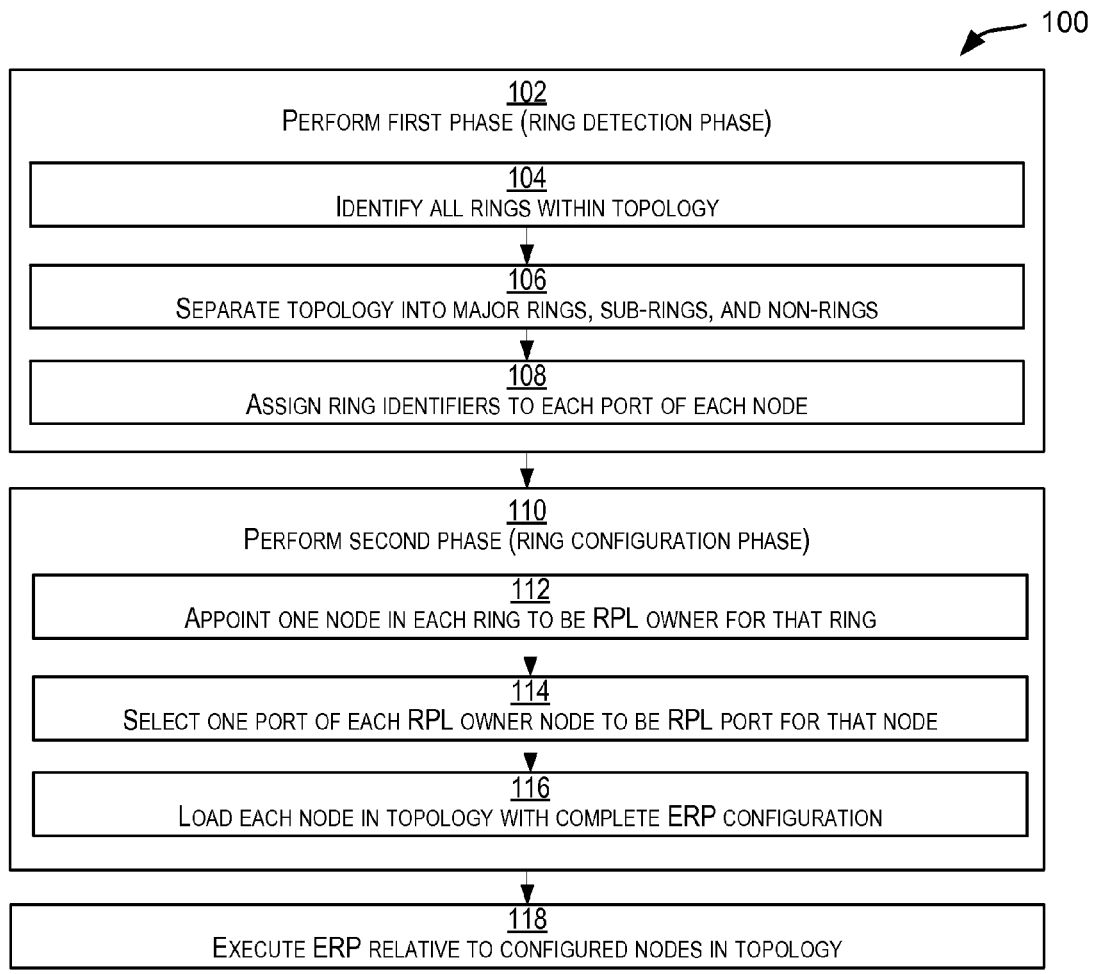
FIG. 1 is a flow diagram that illustrates an example of a high-level overview of a multi-phase technique for automatically identifying and configuring rings within a network topology, according to an embodiment of the invention.

FIG. 1 is a flow diagram that illustrates an example of a high-level overview of a multi-phase technique for automatically identifying and configuring rings within a network topology, according to an embodiment of the invention. In block 102, MRICP can perform actions involved in a first phase, called the ring detection phase. As part of this first phase, in block 104, MRICP can automatically identify all rings within the topology. Also as part of this first phase, in block 106, MRICP can logically separate the topology into major rings, sub-rings, and non-rings. Also as part of this first phase, in block 108, as a part of this identification and separation, MRICP can assign ring identifiers to each port of each node in the topology.

Figure 2:
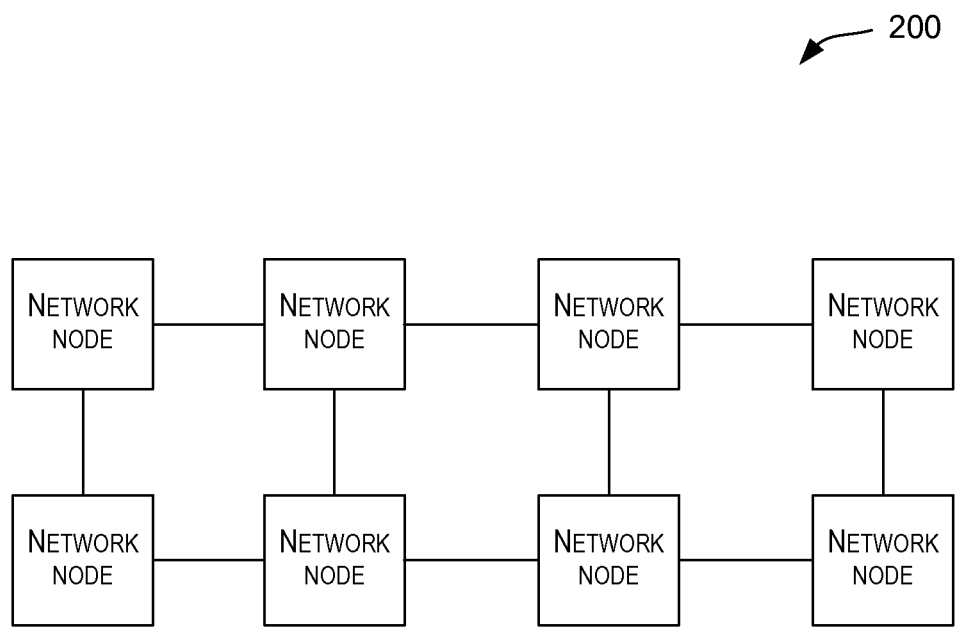
FIG. 2 is a network diagram illustrating an example of an original VLAN topology.
Figure 3:
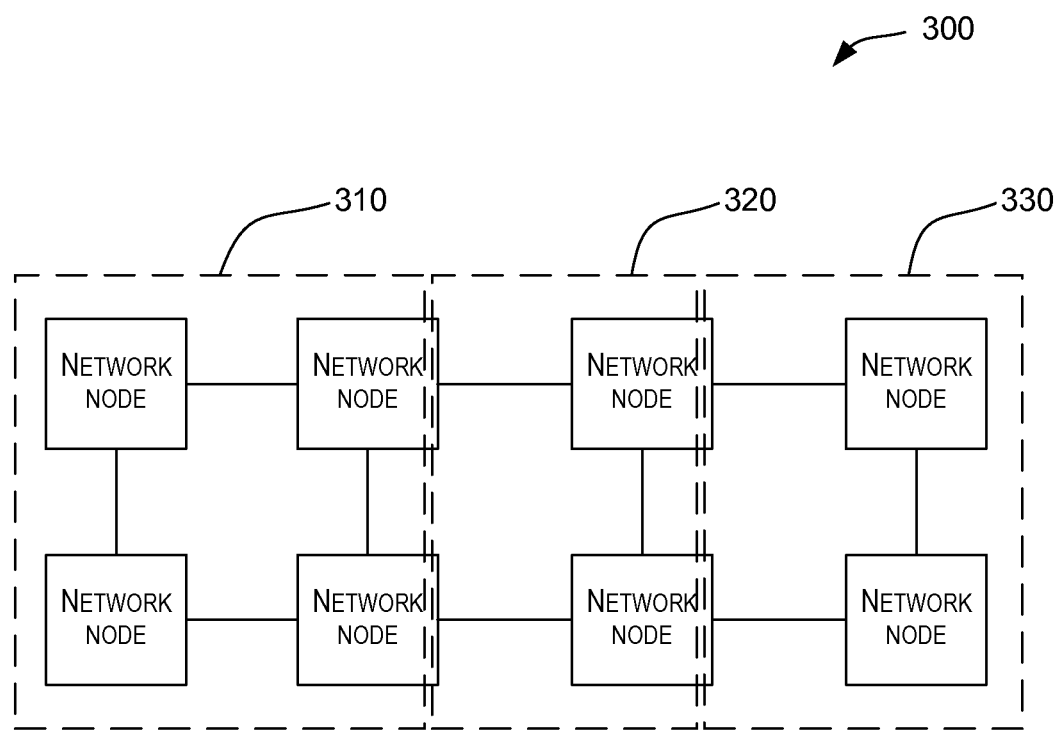
FIG. 3 is a network diagram illustrating an example of a similar VLAN topology in which the performance of MRICP phase one has logically separated the topology into rings, according to an embodiment of the invention.

FIG. 2 is a network diagram illustrating an example of an original VLAN topology 200. Rings within VLAN topology have not yet been identified. FIG. 3 is a network diagram illustrating an example of a similar VLAN topology 300 in which the performance of MRICP phase one has logically separated topology 300 into rings 310, 320, and 330, according to an embodiment of the invention.

Referring again to FIG. 1, in block 110, MRICP can perform actions involved in a second phase, called a ring configuration phase. As part of this second phase, in block 112, MRICP can appoint one node in each ring to be an RPL owner for that ring. Also as part of this second phase, in block 114, MRICP can select one port of each RPL owner node to be an RPL port for that node. Also as a part of this second phase, in block 116, MRICP can load each node in the topology with complete ERP configuration, based on the ring identifiers assigned in block 108.

Figure 4:
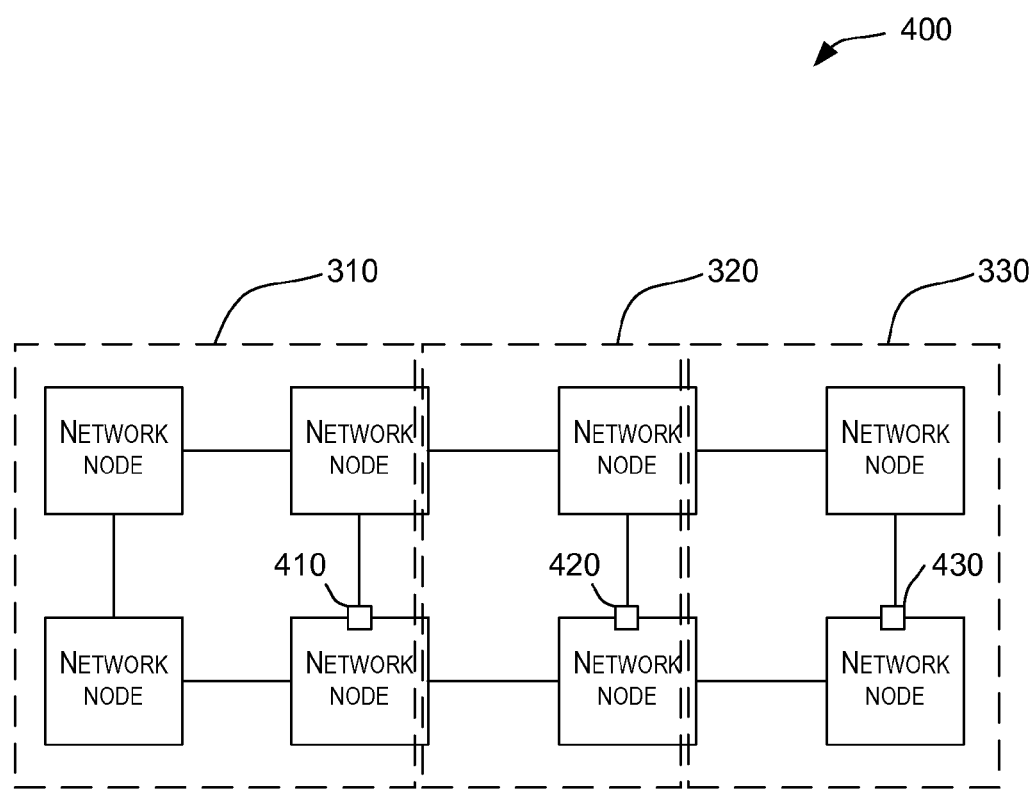
FIG. 4 is a network diagram illustrating an example of a VLAN topology in which a port of each ring in the topology has been selected as an RPL port as a result of the performance of MRICP phase two, according to an embodiment of the invention.

FIG. 4 is a network diagram illustrating an example of a VLAN topology 400 in which a port of each ring in topology 400 has been selected as an RPL port as a result of the performance of MRICP phase two, according to an embodiment of the invention. Ports 410 (of ring 310), 420 (of ring 320), and 430 (of ring 330) have been selected as RPL ports for their respective rings in this example.

Referring again to FIG. 1, in block 118, MRICP can execute ERP relative to the configured nodes in the topology. In an embodiment, ERP can block each ring's RPL port (selected in block 114) and can maintain that port in readiness to change from a blocked to a forwarding state in the event that a link failure occurs somewhere within that ring.

Figure 5:
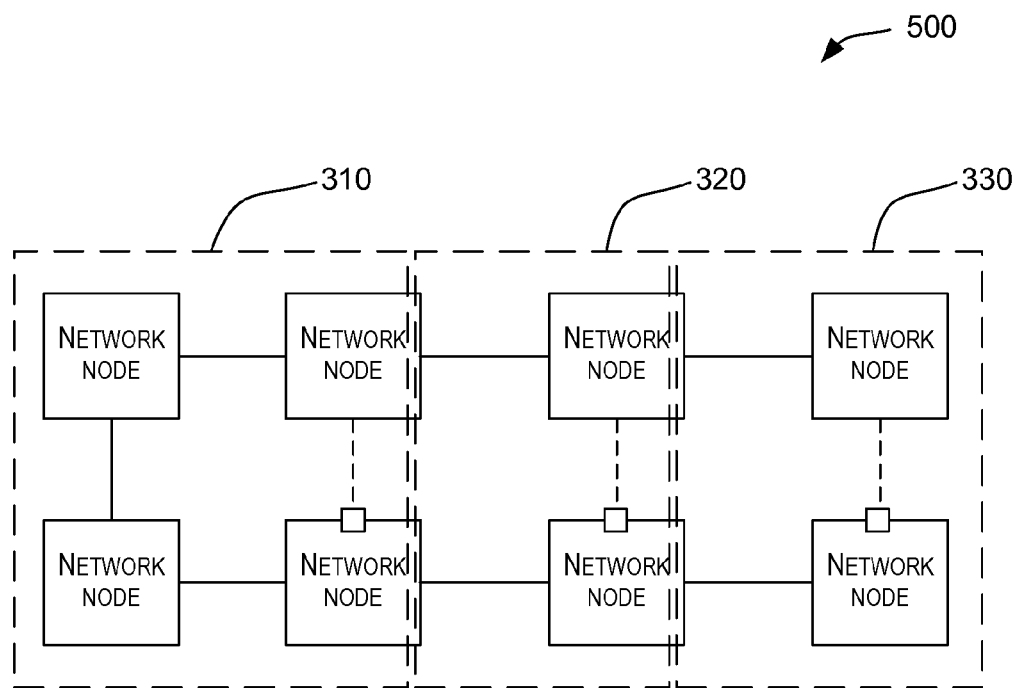
FIG. 5 is a network diagram illustrating an example of a VLAN topology in which the RPL ports of each of the rings have been blocked as a result of the performance of ERP relative to the rings configured by MRICP, according to an embodiment of the invention.
Figure 6:
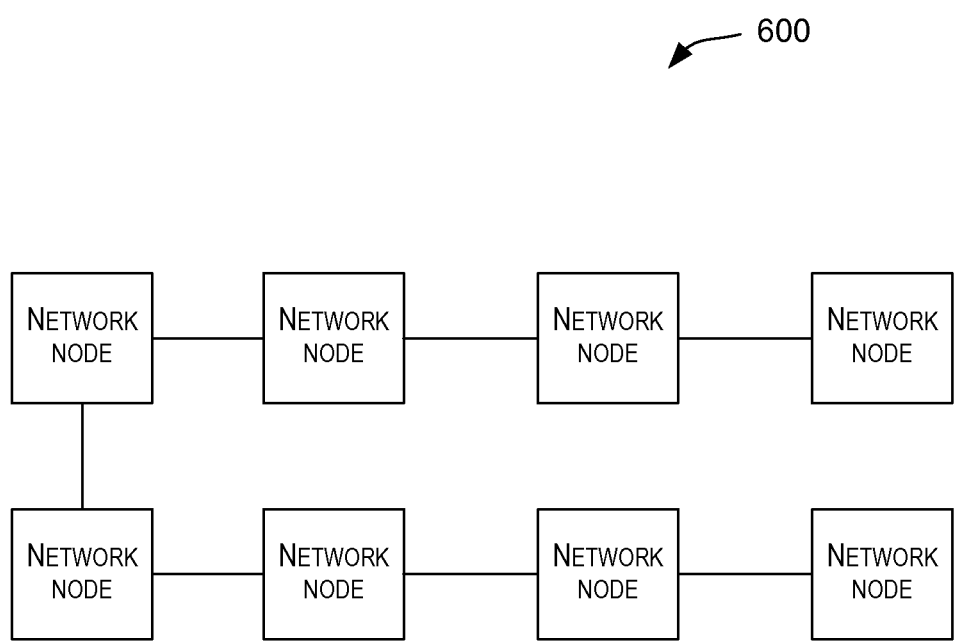
FIG. 6 is a network diagram illustrating an example of a VLAN topology in which data traffic can flow through loop-free paths established a result of the port blocking performed relative to the VLAN topology, according to an embodiment of the invention.

FIG. 5 is a network diagram illustrating an example of a VLAN topology 500 in which the RPL ports of each of rings 310, 320, and 330 have been blocked as a result of the performance of ERP relative to the rings configured by MRICP as shown in FIG. 4, according to an embodiment of the invention. FIG. 6 is a network diagram illustrating an example of a VLAN topology 600 in which data traffic can flow through loop-free paths established a result of the port blocking performed relative VLAN topology 500 as shown in FIG. 5, according to an embodiment of the invention.

Partitioning Networks into Rings Using Conflict Resolution Rules

In an embodiment of the invention, a network can be automatically partitioned conceptually into separate rings, which can be closed rings or open rings. Conceptually, within a graph of edges interconnected by vertices, both kinds of rings can be superimposed upon complete circuits, but while the edges of a closed ring form a complete circuit that can be traversed without traversing any edges not belonging to that closed ring, the edges of open rings do not; one or more edges not belonging to a particular open ring (but potentially belonging to some other ring(s)) must be traversed in order to traverse any complete circuit upon which that particular open ring can be superimposed. The goal of the automatic partitioning process can be to ensure that each link connecting a pair of nodes within the network belongs to only one ring. When this condition is satisfied for each link in the network, then the network has been completely partitioned into rings. Beneficially, then, each such ring can be configured independently using the Ethernet Ring Protocol (ERP) protocol, producing a network in which a link failure in any particular ring will only necessitate that the network nodes in that particular ring—instead of all of the network nodes in the entire network—re-learn network communication paths that might have involved the failed link. When a network's links are assigned to single rings in that network, then only the media access control (MAC) forwarding tables of the nodes connected to links of a ring containing a failed link—rather than the MAC forwarding tables of every node in the network—need to be flushed. Consequently, the network communication path re-learning process can require less time, and periods of network communication interruption can be reduced.

According to an embodiment, each ring in the network is composed of a series of network links that are communicatively coupled to each other, end-to-end, by network nodes that occur at the junctions of those links. Each ring's set of network links can be given a different ring identifier. Such a ring identifier can be numeric. Each network node can have multiple ports to which links belonging to different rings can be directly connected. Each such port can be assigned the ring identifier that is associated with the link to which that port is connected. In a graph, any given vertex of a ring's several vertices cannot be directly connected to more than any given two of that ring's several edges. It follows that no more than two links belonging to the same ring can be permitted to be directly connected to any given node's ports during the performance of the ring partitioning technique. Therefore, according to an embodiment, no more than two ports of any given node are allowed to be assigned the same ring identifier.

Techniques discussed herein can automatically assign ring identifiers to each of a network's links by automatically assigning those ring identifiers to the network node ports to which those links are directly connected. Ring identifiers can be assigned automatically to node ports through a technique that involves the forwarding, from node to node over various network links, of network packets that specify ring identifiers. Generally speaking, with some exceptions, as a node receives a ring-identifying packet through a port of that node, the node can assign, to that port, the ring identifier that is specified by that packet. Again with some exceptions, the node can then forward that packet out through another of that node's ports and can also assign the same ring identifier to that other port. With some exceptions, in this general manner, the node can become a part of the ring that is identified by that ring identifier. Other nodes that subsequently receive the forwarded packet can follow a similar process in handling the packet, thereby joining the same ring.

According to an embodiment, some of the exceptions mentioned above can arise in response to the occurrence of, and network node's detection of, certain conflicts. Such conflicts can occur when assigning a packet's ring identifier to a network node's port would cause that ring identifier to become associated with more than two of that network node's ports concurrently. Such an assignment would erroneously cause more than two of the links directly connected to the network node to be assigned to the same ring concurrently. Two different scenarios can produce such a conflict. Under the first scenario, a node having two ports that are already associated with a particular ring identifier can receive, on another port not currently associated with that particular ring identifier, a packet specifying that particular ring identifier. In this scenario, assigning the particular ring identifier to the ingress port would erroneously cause three ports of the same node to become associated with the same ring identifier concurrently. Under the second scenario, a node having a first port that is already associated with a first ring identifier can receive, on a second port that concurrently shares a second ring identifier with a third port, a packet specifying the first ring identifier. In this scenario, assigning the first ring identifier to both the second (ingress) port and the third (egress) port also would erroneously cause three ports of the same node to become associated with the same ring identifier concurrently. To prevent such erroneous associations of the same ring identifier to more than two of a network node's ports concurrently, the network node can perform a rules-based conflict resolution technique in response to detecting the existence of either scenario. Generally speaking, under either scenario, the node's performance of the conflict resolution technique can prevent at least the node's ingress port from becoming associated with the ring identifier specified in the incoming packet, while also permitting the automatic ring partitioning process to progress.

Automatic Ring Identification

FIGS. 7A-7D show a flow diagram that illustrates a technique for automatically discovering rings in a VLAN and assigning ring identifiers—referred to below more specifically as ERP identifiers—to the node ports involved in those rings, according to an embodiment of the invention. The technique can involve the generation and forwarding of different kinds of MRICP packets, including "discovery" and "assignment" packets, from node to node along links that connect those nodes at those nodes' ports. These MRICP packets can be control packets, and as such, can travel even through ports that are blocked relative to normal data traffic.

Figure 7A:
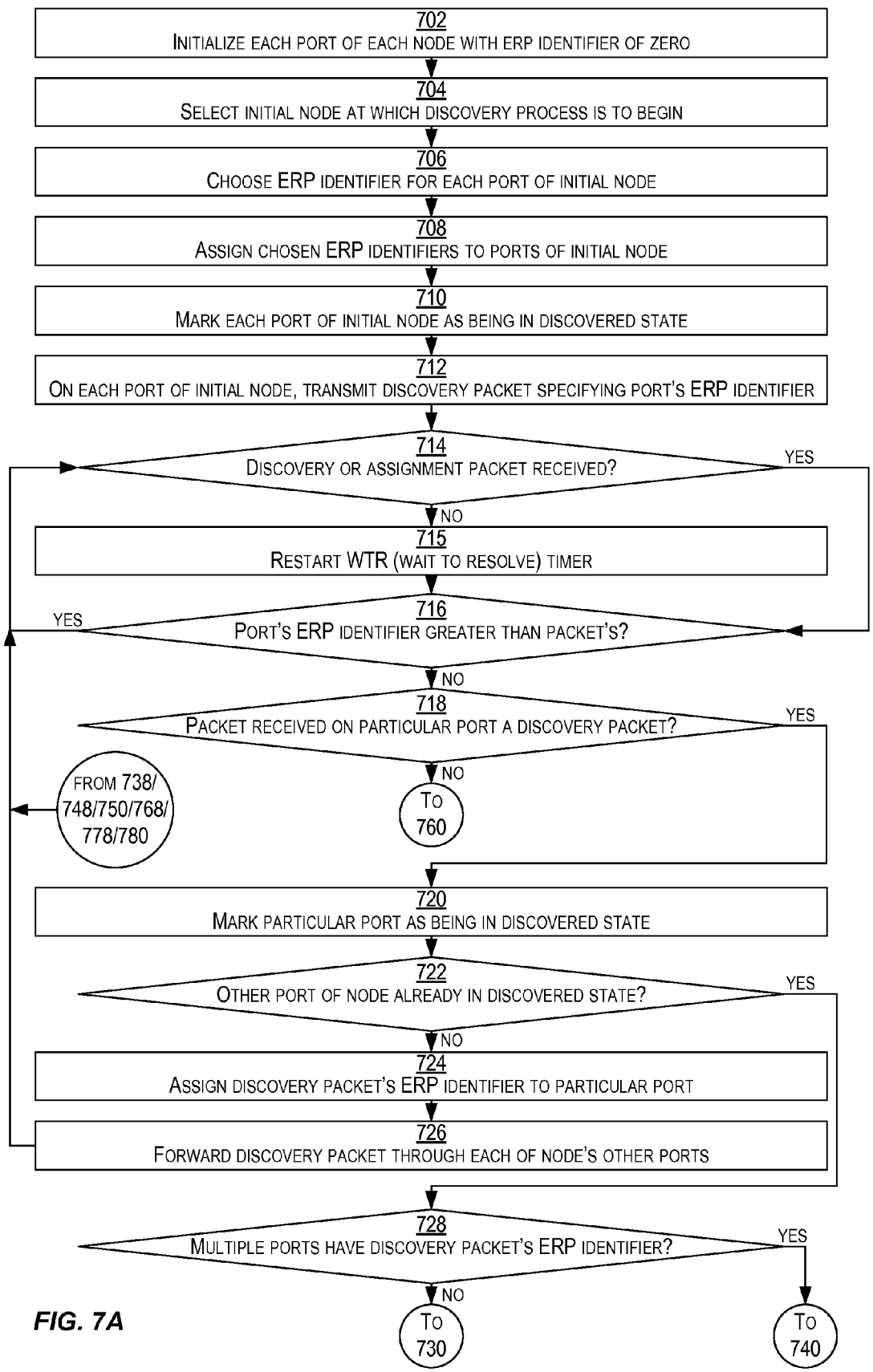
FIGS. 7A-7D show a flow diagram that illustrates a technique for automatically discovering rings in a VLAN and assigning ring identifiers to the node ports involved in those rings, according to an embodiment of the invention.

Referring first to FIG. 7A, in block 702, each network port of each node can be initialized with an ERP identifier of zero. In block 704, an initial node can be selected to be a node at which the discovery process is to begin. In an embodiment, a human user can use a command line interface of the initial node in order to command the node to begin the discovery process. In block 706, for each of its ports to which a network link is connected, the initial node can choose an ERP identifier that is incrementally greater than the last ERP identifier chosen, beginning with an ERP identifier of one. For example, if the initial node has two ports that are connected to network links, then the initial node can select an ERP identifier of one for the first port and an ERP identifier of two for the second port. In block 708, for each of its ports to which a network link is connected, the initial node can assign, to that port, the ERP identifier chosen for that port. In block 710, for each of its ports to which a network link is connected, the initial node can mark that port as being in a "discovered" state. In block 712, for each of its ports to which a network link is connected, the initial node can transmit, on that port, a discovery packet that specifies that port's assigned ERP identifier.

The following operations can be performed by each node in the VLAN, including the initial node, independently and asynchronously relative to each other. In block 714, the node can determine whether it has received a discovery or assignment packet on any of its ports. If so, then control passes to block 716. Otherwise, control passes back to block 715. In block 715, the node can restart a WTR (wait to resolve) timer. Control passes to block 716. In block 716, in response to the receipt of a discovery or assignment packet on a particular port, the node can determine whether the particular port has already been assigned an ERP identifier that is greater than the ERP identifier specified in the discovery or assignment packet. If so, then the node can drop the discovery or assignment packet, not forwarding the discovery or assignment packet, and control passes back to block 714. Otherwise, control passes to block 718.

In block 718, the node can determine whether the packet received on a particular port of that node is a discovery packet. If a discovery packet has been received on the particular port, then control passes to block 720. Otherwise, the packet is an assignment packet, and control passes to block 760 of FIG. 7D.

In block 720, the node can mark the particular port as being in the "discovered" state. In block 722, the node can determine whether a second port of that node is already marked as being in the "discovered" state. If so, then control passes to block 728. Otherwise, control passes to block 724. In block 724, the node can assign, to the particular port, the ERP identifier specified in the discovery packet. In block 726, the node can forward the discovery packet through each of the node's other ports. Control passes back to block 714.

Alternatively, in block 728, the node can determine whether more than one port of the node already has been assigned the ERP identifier specified in the discovery packet. If so, then control passes to block 740 of FIG. 7C to resolve the conflict. Otherwise, control passes to block 730 of FIG. 7B.

Figure 7B:
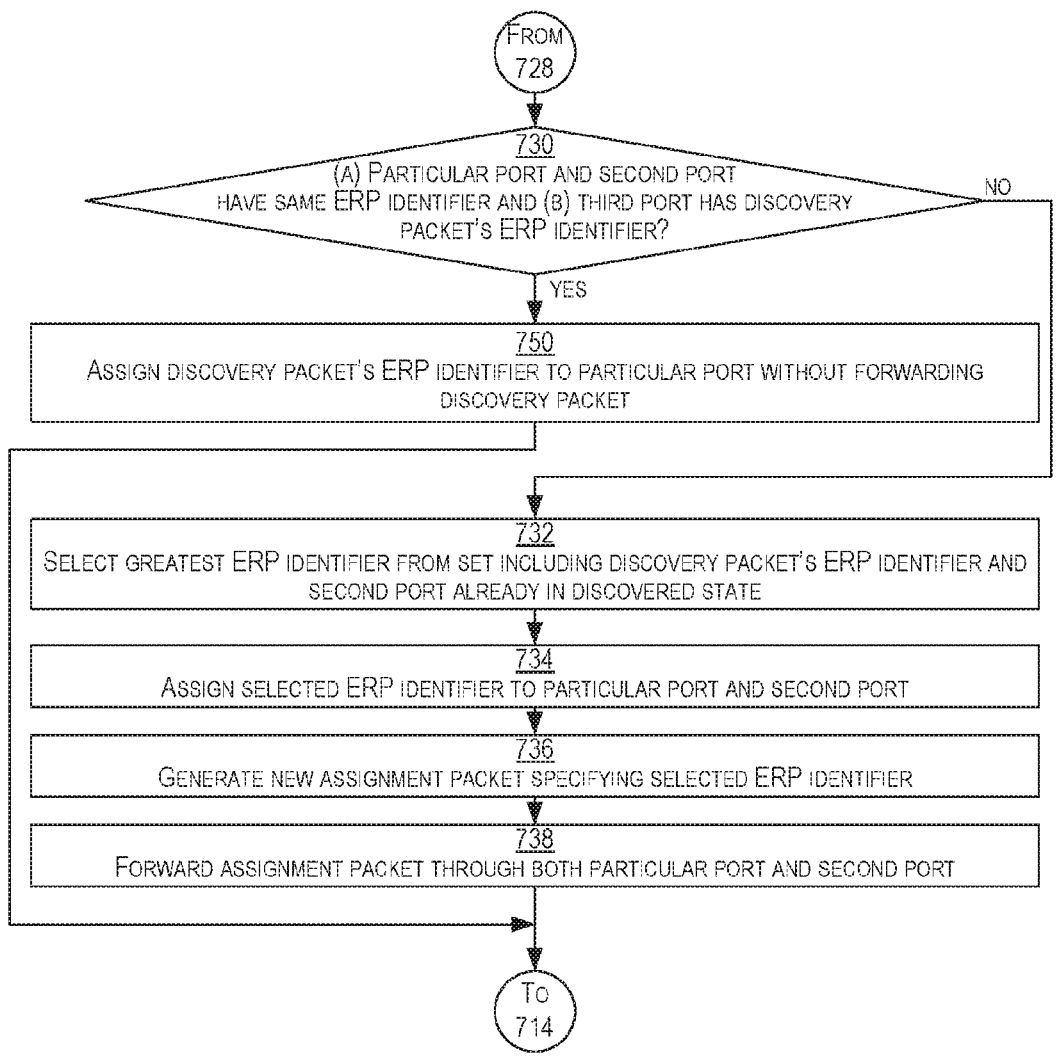

Referring now to FIG. 7B, in block 730, the node can determine whether (a) both the particular port of the node and a second port of the node already have been assigned an identical ERP identifier (but not necessarily the same ERP identifier specified in the discovery packet) and also (b) a third port of the node already has been assigned the ERP identifier specified in the discovery packet. If so, then control passes to block 750 to resolve the conflict. Otherwise, control passes to block 732.

In block 732, having determined that no conflict will arise, the node can select the greatest ERP identifier from a set of ERP identifiers including both (a) the ERP identifier specified in the discovery packet and (b) an ERP identifier already assigned to a second (i.e., not the particular) port of the node that has been marked as being in the "discovered" state. In block 734, the node can assign the selected ERP identifier to both the particular port and the second port. In block 736, the node can generate a new assignment packet specifying the selected ERP identifier. In block 738, the node can forward the assignment packet through both the particular port and the second port. The node does not forward the discovery packet under these circumstances. Control passes back to block 714 of FIG. 7A.

Figure 7C:
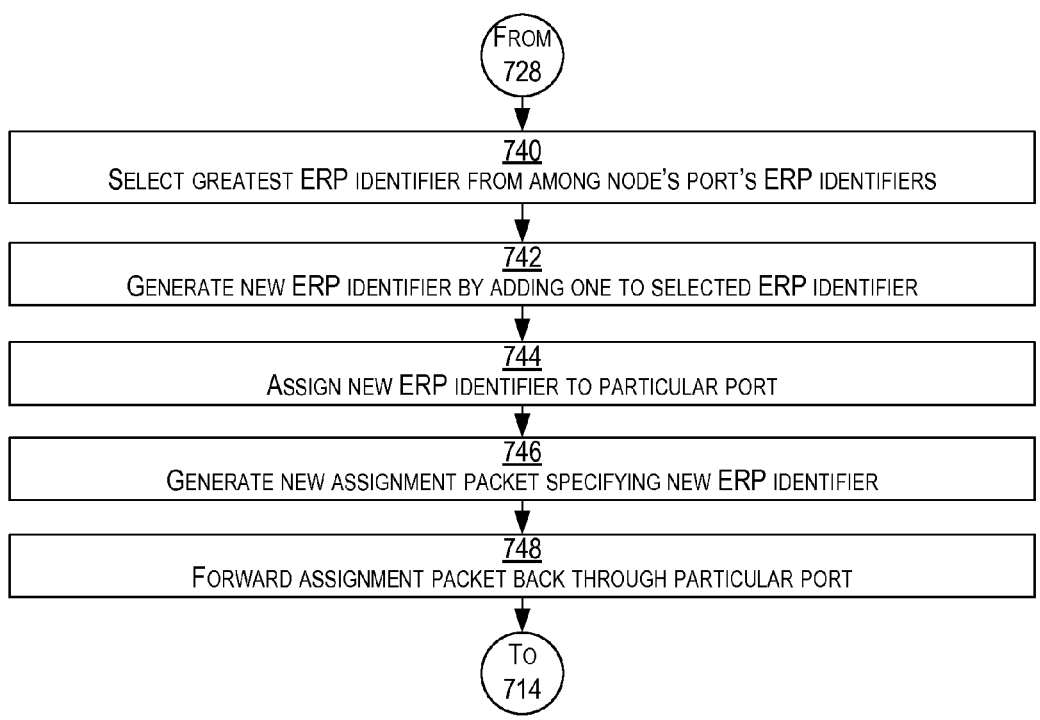

Referring now to FIG. 7C, alternatively, in block 740, having determined that assigning the discovery packet's ERP identifier to the particular port alone would cause at least three of the node's ports to have the same ERP identifier (a forbidden condition that would cause that ERP identifier to be spread among more than one ring) due to two others of the node's ports already having the discovery packet's ERP identifier, the node can begin to resolve the conflict by selecting the greatest ERP identifier from a set including the ERP identifiers already assigned to the node's ports. In block 742, the node can generate a new ERP identifier by adding one to the selected ERP identifier. In block 744, the node can assign the new ERP identifier to the particular port. In block 746, the node can generate a new assignment packet specifying the new ERP identifier. In block 748, the node can forward the assignment packet back through the particular port through which the discovery packet was received. The node does not forward the discovery packet under these circumstances. Control passes back to block 714 of FIG. 7A.

Alternatively, in block 750, having determined that assigning the discovery packet's ERP identifier to both the particular port and a second port having an ERP identifier that is identical to the particular port's current ERP identifier would cause at least three of the node's ports to have the same ERP identifier (a forbidden condition that would cause that ERP identifier to be spread among more than one ring) due to a third port of the node already having the discovery packet's ERP identifier, the node can resolve the conflict by assigning the discovery packet's ERP identifier to the particular port without forwarding the discovery packet. As a result, only two of the node's ports end up having the discovery packet's ERP identifier following the assignment. Control passes back to block 714 of FIG. 7A.

Figure 7D:
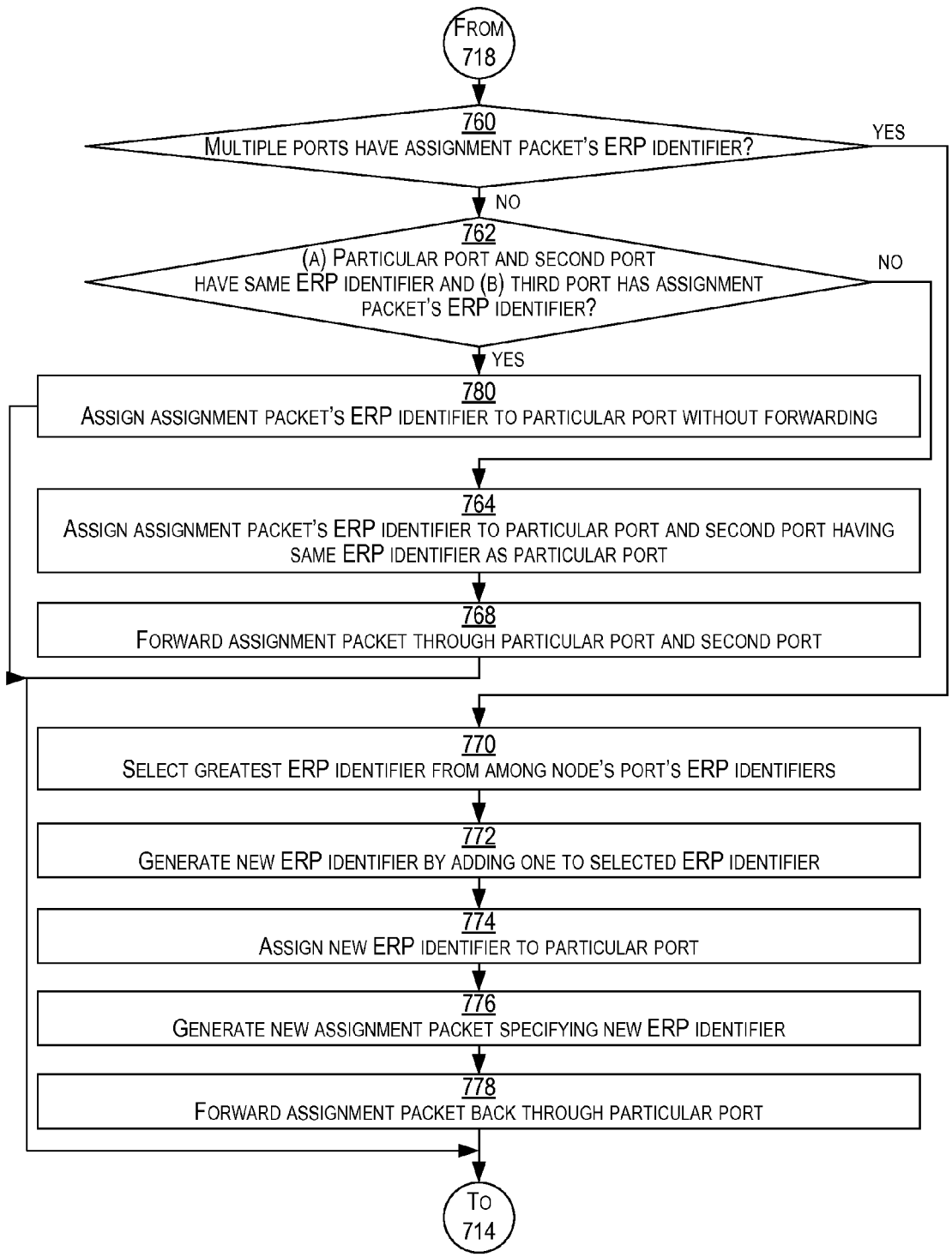

Referring now to FIG. 7D, alternatively, in block 760, the node can determine whether more than one port of the node already has been assigned the ERP identifier specified in the assignment packet. If so, then control passes to block 770 to resolve the conflict. Otherwise, control passes to block 762. In block 762, the node can determine whether (a) both the particular port of the node and a second port of the node already have been assigned an identical ERP identifier (but not necessarily the same ERP identifier specified in the assignment packet) and also (b) a third port of the node already has been assigned the ERP identifier specified in the assignment packet. If so, then control passes to block 780 to resolve the conflict. Otherwise, control passes to block 764.

In block 764, having determined that no conflict will arise, the node can assign the assignment packet's ERP identifier to ports of that node including both the particular port and a second port that has an ERP identifier identical to that of the particular port. In block 766, the node can forward the assignment packet through both the particular port and the second port. Control passes back to block 714 of FIG. 7A.

Alternatively, in block 770, having determined that assigning the assignment packet's ERP identifier to the particular port alone would cause at least three of the node's ports to have the same ERP identifier (a forbidden condition that would cause that ERP identifier to be spread among more than one ring) due to two others of the node's ports already having the assignment packet's ERP identifier, the node can begin to resolve the conflict by selecting the greatest ERP identifier from a set including the ERP identifiers already assigned to the node's ports. In block 772, the node can generate a new ERP identifier by adding one to the selected ERP identifier. In block 774, the node can assign the new ERP identifier to the particular port. In block 776, the node can generate a new assignment packet specifying the new ERP identifier. In block 778, the node can forward the new assignment packet back through the particular port through which the old assignment packet was received. The node does not forward the old assignment packet under these circumstances. Control passes back to block 714 of FIG. 7A.

Alternatively, in block 780, having determined that assigning the assignment packet's ERP identifier to both the particular port and a second port having an ERP identifier that is identical to the particular port's current ERP identifier would cause at least three of the node's ports to have the same ERP identifier (a forbidden condition that would cause that ERP identifier to be spread among more than one ring) due to a third port of the node already having the assignment packet's ERP identifier, the node can resolve the conflict by assigning the assignment packet's ERP identifier to the particular port without forwarding the assignment packet. As a result, only two of the node's ports end up having the assignment packet's ERP identifier following the assignment. Control passes back to block 714 of FIG. 7A.

Eliminating Loops Formed within Sets of Major Rings

Figure 8:
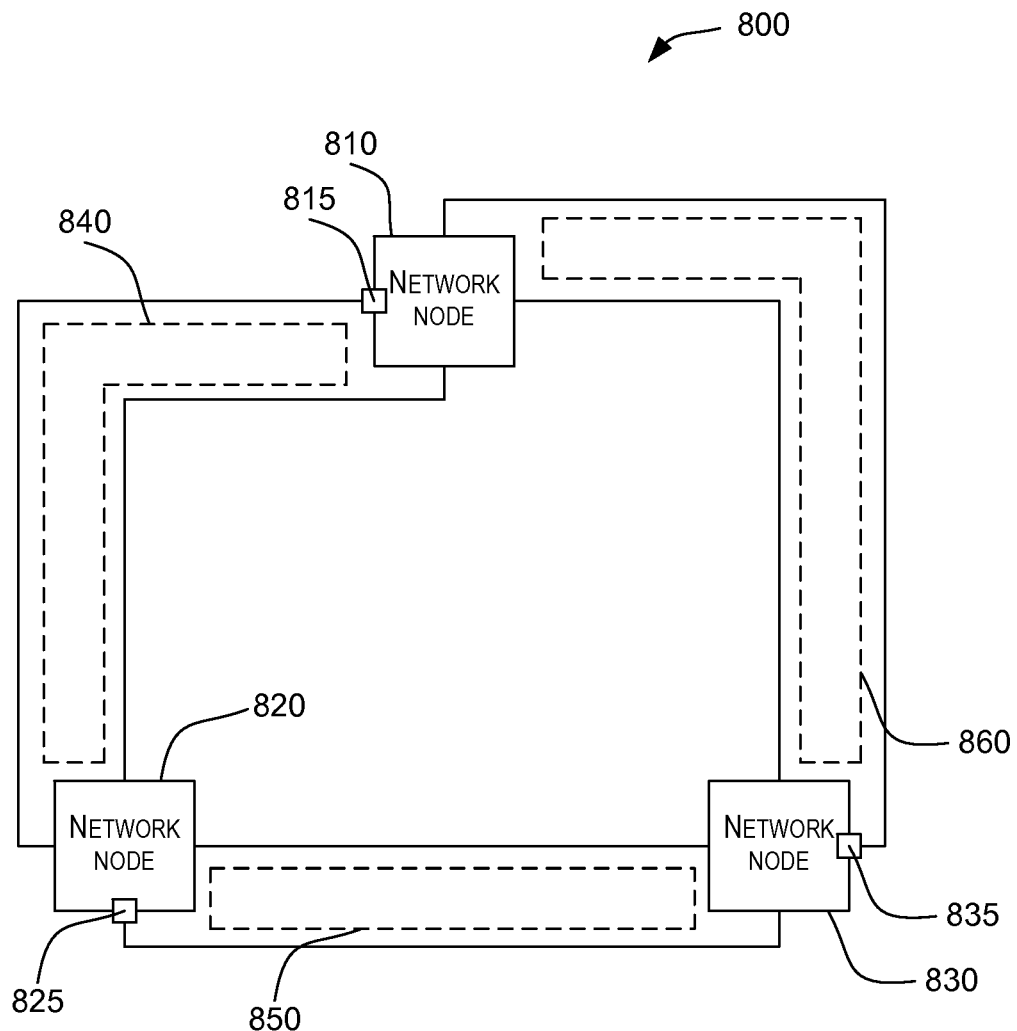
FIG. 8 is a network diagram that illustrates an example of a VLAN topology in which three nodes are interconnected by major rings.

Even after the performance of the technique discussed above in connection with FIGS. 7A-7D, it is possible in some network topologies that two or more major rings identified using that technique can exist such that even after RPL owner ports are blocked in each of those major rings, a loop can persist among some of the links connecting the nodes involved in those major rings. FIG. 8 is a network diagram that illustrates an example of a VLAN topology 800 in which three nodes 810, 820, and 830 are interconnected by major rings 840, 850, and 860. In spite of RPL owner ports 815 (for node 810), 825 (for node 820) and 835 (for node 830) being blocked, a loop between nodes 810, 820, and 830 still exists along which data traffic could travel. MRICP seeks to avoid the persistence of such loops prior to the performance of RPL owner port blocking Therefore, in an embodiment of the invention, MRICP can involve a technique whereby loops existing among nodes interconnecting multiple major rings can be identified automatically. In such an embodiment, MRICP can also involve a technique through which one of the major rings involved in such a loop can be split into separate sub-rings automatically, so that when the RPL owner ports of the resulting rings are later blocked, the loop will not persist. The technique can be performed following the performance of the technique discussed above in connection with FIG. 7, for example.

Figure 9A:
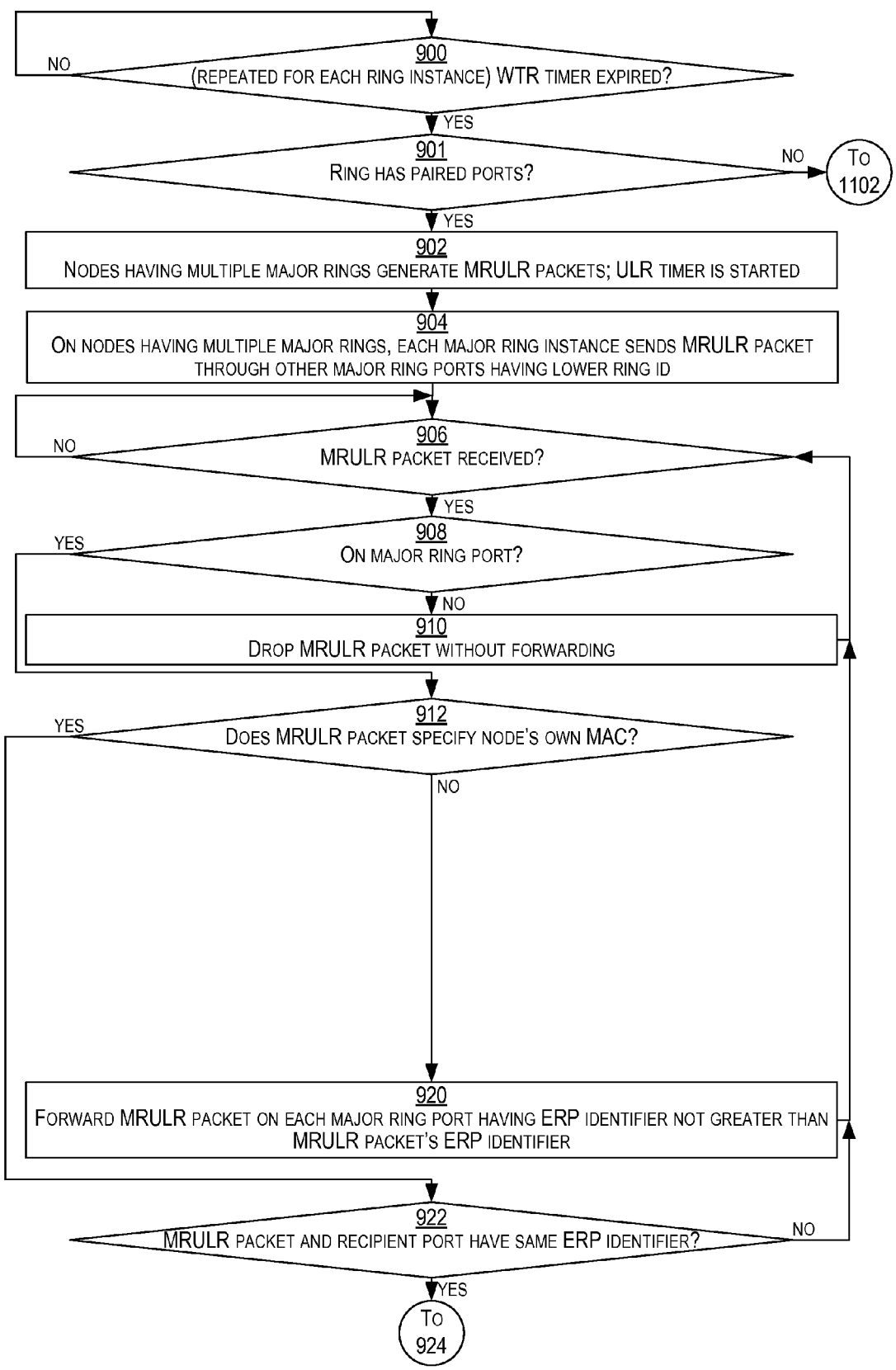
FIGS. 9A-9B show a flow diagram that illustrates a technique for automatically discovering loops existing among nodes interconnecting multiple major rings and for automatically splitting one of the major rings involved in such a loop into separate sub-rings, according to an embodiment of the invention.
Figure 9B:
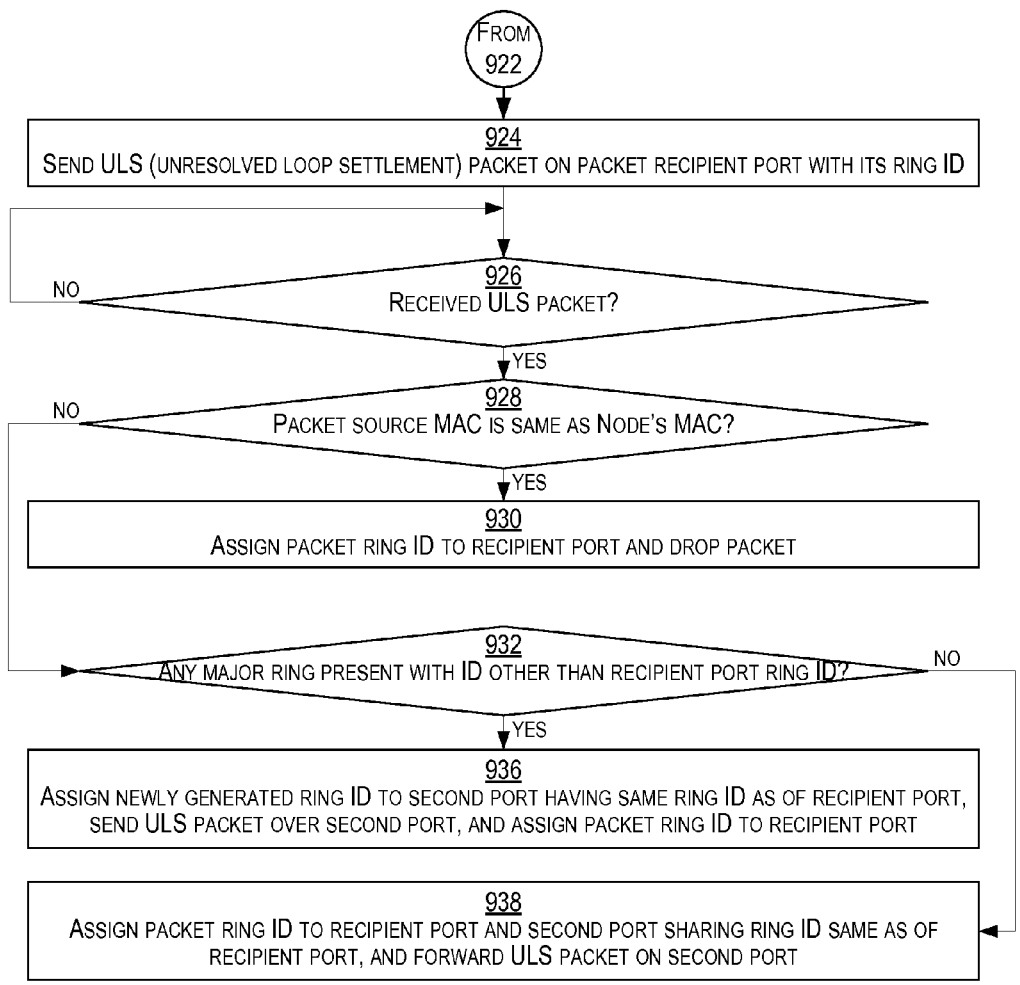

FIGS. 9A-9B show a flow diagram that illustrates a technique for automatically discovering loops existing among nodes interconnecting multiple major rings and for automatically splitting one of the major rings involved in such a loop into separate sub-rings, according to an embodiment of the invention. Ports belonging to a pair of ports that share the same ERP identifier are referred to herein as "major ring ports." Referring first to FIG. 9A, initially, in block 900, the node can determine, for each ring instance in which the node is involved, whether the WTR timer for that ring instance has expired. If any ring instance's WTR timer has expired, then control passes to block 901. Otherwise, control passes back to block 900. In block 901, the node can determine whether the ring instance for which the WTR timer expired has paired ports. If so, then control passes to block 902. Otherwise, control passes to block 1102 of FIG. 11. In block 902, each paired port (port which can find another port with same assigned id as its own) can generate, for remaining paired rings having ring id equal to or less than its own ring id a separate MRICP packet having "MAJOR_RING_ULR" (ULR standing for undiscovered loop resolution) as its opcode (operation code). MRICP packet having such an opcode is referred to herein as a "MRULR packet". Each such MRULR packet additionally can specify (a) the MAC of the node at which that MRULR packet was generated and (b) an ERP identifier of one of that node's port pairs. The node can generate a separate MRULR packet for each such port pair. Additionally, a ULR timer can be started. In block 904, each such node involved in a major ring can forward, on each of that node's ports involved in such a pair (a node might have multiple such pairs), the MRULR packet that was generated at that node.

The following operations can be performed by each node in the VLAN independently and asynchronously relative to each other. In block 906, a node can determine whether it has received a MRULR packet on any of its ports. If so, then control passes to block 908. Otherwise, control passes back to block 906. In block 908, the node can determine whether the port on which the MRULR packet was received is a major ring port. If so, then control passes to block 912. Otherwise, control passes to block 910.

In block 910, the node can drop the MRULR packet without forwarding the MRULR packet. Control passes back to block 906.

Alternatively, in block 912, the node can determine whether the MRULR packet specifies the node's own MAC. If so, then the MRULR packet has returned to the node from which it originated, and control passes to block 922. Otherwise, control passes to block 920.

Alternatively, in block 920, the node can forward the MRULR packet on each of the node's major ring ports that has an ERP identifier that is not greater than the MRULR packet's specified ERP identifier. Control passes back to block 906.

Alternatively, in block 922, in response to determining that the MRULR packet has returned to the node from which it originated, the node can determine whether the MRULR packet's specified ERP identifier is the same as the ERP identifier of the particular port on which the MRULR packet was received. If so, then the MRULR packet has arrived back at the originating node through the same major ring on which the originating node forwarded the MRULR packet, and control passes to block 924 of FIG. 9B. Otherwise, the MRULR packet has arrived back at the originating node through a major ring other than the major ring on which the originating node forwarded the MRULR packet, indicating that a forbidden loop persists, and control passes back to block 906.

Referring now to FIG. 9B, in block 924, the node can send an unresolved loop settlement (ULS) packet on the packet recipient port that has the packet's ring ID. In 926, the node can determine whether it has received a ULS packet. If so, then control passes to block 928. Otherwise, control passes back to block 926. In block 928, the node can determine whether the packet's source MAC is the same as the node's own MAC. If so, then control passes to block 930. Otherwise, control passes to block 932. In block 930, the node assigns the packet's ring ID to the recipient port and drops the packet. Alternatively, in block 932, the node can determine whether there is any major ring present with an ID other than the recipient port's ring ID. If so, then control passes to block 936. Otherwise, control passes to block 938. In block 936, the node can assign a newly generated ring ID to a second port that has the same ring ID as the recipient port. The node can also send a ULS packet over the second port. The node can also assign the packet's ring ID to the recipient port. Alternatively, in block 938, the node can assign the packet's ring ID to the recipient port and a second port that shares the same ring ID as the recipient port. The node can also forward the ULS packet on the second port. As a consequence of the performance of this technique using the new ERP identifiers, one of the major rings to which the originating nodes is connected will be logically separated into two new sub-rings that replace that major ring in the topology. When RPL owner port blocking is subsequently performed for each ring (including the new sub-rings) the loop that previously persisted among the major rings will no longer exist.

Eliminating Loops Formed in Major Ring-And-Sub-Ring Combinations

Figure 10:
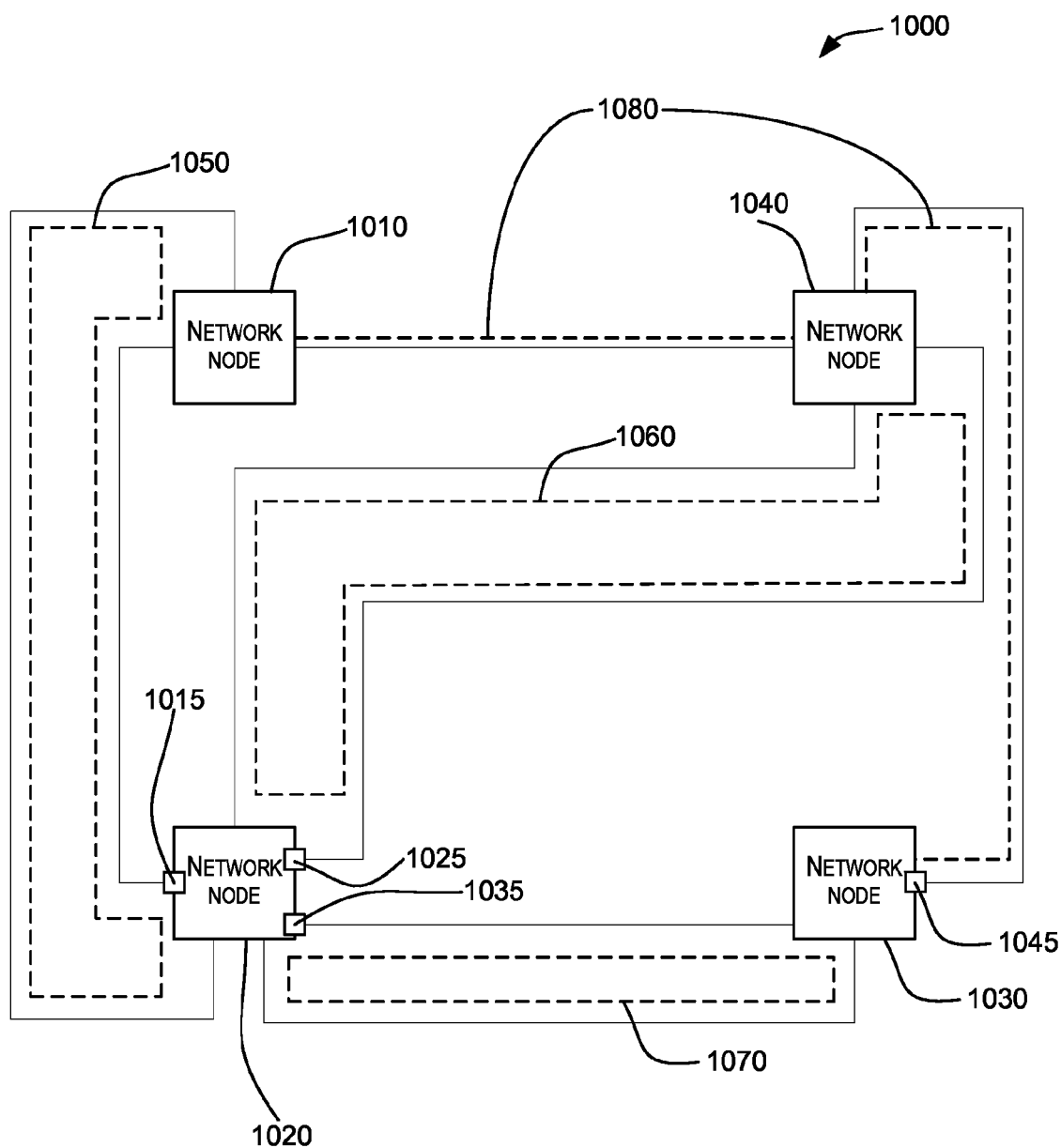
FIG. 10 is a network diagram that illustrates an example of a VLAN topology in which a node is involved in separate major rings with other nodes, and in which the other nodes are involved in a sub-ring.

Even after the performance of the technique discussed above in connection with FIG. 7, it is possible in some network topologies that a combination of a major ring and a sub-ring identified using that technique can exist such that even after RPL owner ports are blocked in both the major and the sub-ring, a loop can persist among some of the links connecting the nodes involved in that ring combination. FIG. 10 is a network diagram that illustrates an example of a VLAN topology 1000 in which node 1020 is involved in separate major rings 1050, 1060, and 1070 with nodes 1010, 1040, and 1030, respectively, and in which nodes 1010, 1030, and 1040 are involved in a sub-ring 1080. In spite of RPL owner ports 1015, 1025, 1035, and 1045 being blocked, a loop between nodes 1010, 1020, and 1030 still exists along which data traffic could travel. It should be noted that the link between nodes 1010 and 1040 is a part of a sub-ring while the other links in the loop are part of a major ring. MRICP seeks to avoid the persistence of such loops prior to the performance of RPL owner port blocking Therefore, in an embodiment of the invention, MRICP can involve a technique whereby loops existing within major ring-and-sub-ring combinations can be identified automatically. In such an embodiment, MRICP can also involve a technique through which the sub-ring involved in such a loop can be broken automatically at nodes that are both (a) intermediate in (not end-points of) that sub-ring and (b) involved in a major ring, so that when the RPL owner ports of the remaining rings are later blocked, the loop will not persist. The technique can be performed following the performance of the technique discussed above in connection with FIG. 7, for example.

Figure 11:
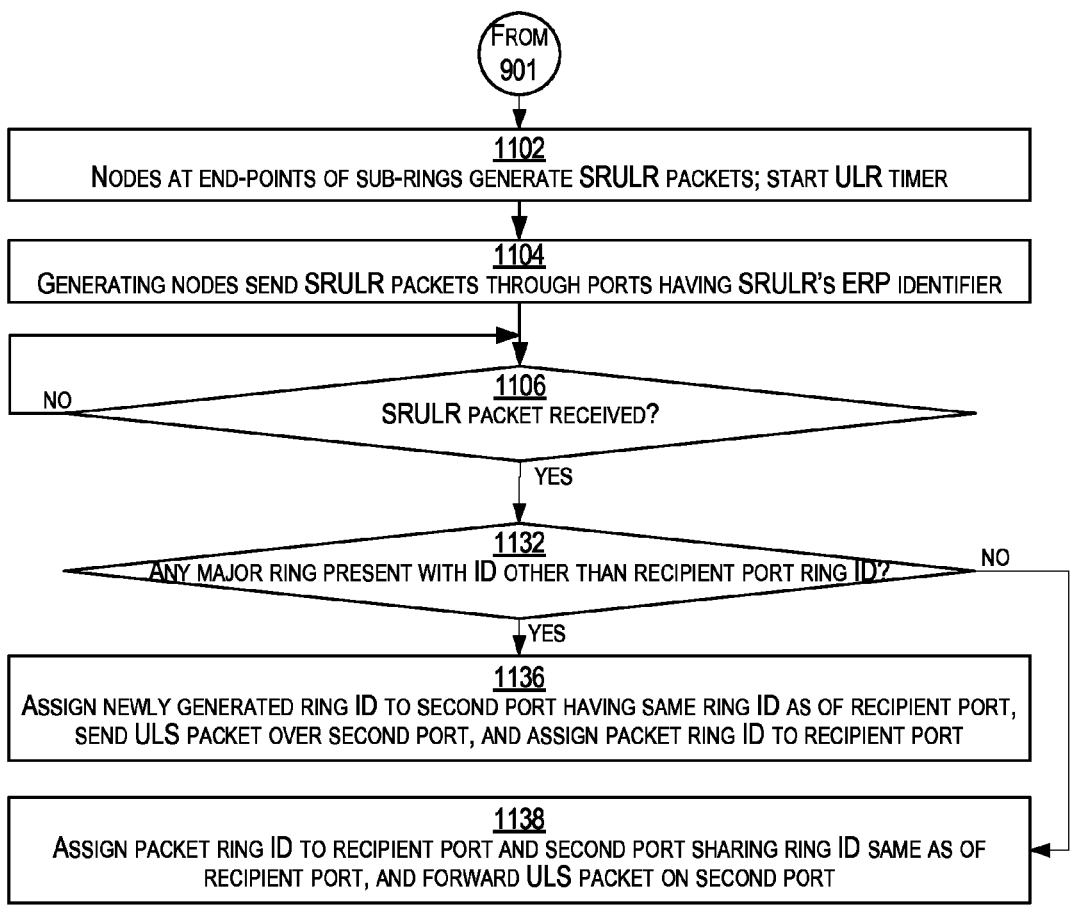
FIG. 11 is a flow diagram that illustrates a technique for automatically discovering loops existing among major ring-and-sub-ring combinations and for automatically breaking sub-rings belonging to such combinations, according to an embodiment of the invention.

FIG. 11 is a flow diagram that illustrates a technique for automatically discovering loops existing among major ring-and-sub-ring combinations and for automatically breaking sub-rings belonging to such combinations, according to an embodiment of the invention. Initially, in block 1102, each node that is an end-point of a sub-ring—that is, each node having a port that has an ERP identifier not shared by any other port of that node—can generate a separate MRICP packet having "SUB_RING_ULR" (ULR standing for undiscovered loop resolution) as its opcode. Such an MRICP packet having such an opcode is referred to herein as a "SRULR packet." Each such SRULR packet additionally can specify the ERP identifier that is unshared among (i.e., assigned to only one of) the end-point node's ports; this is the ERP identifier of the port that connects the end-point node to the sub-ring. Additionally, a ULR timer can be started. In block 1104, each such end-point node can forward, on the port that has the SRULR packet's ERP identifier, the SRULR packet generated at that end-point node.

The following operations can be performed by each node in the VLAN independently and asynchronously relative to each other. In block 1106, a node can determine whether it has received a SRULR packet on any of its ports. If so, then control passes to block 1132. Otherwise, control passes back to block 1106.

In block 1132, the node can determine whether there is any major ring present with an ID other than the recipient port's ring ID. If so, then control passes to block 1136. Otherwise, control passes to block 1138. In block 1136, the node can assign a newly generated ring ID to a second port that has the same ring ID as the recipient port. The node can also send a ULS packet over the second port. The node can also assign the packet's ring ID to the recipient port. Alternatively, in block 1138, the node can assign the packet's ring ID to the recipient port and a second port that shares the same ring ID as the recipient port. The node can also forward the ULS packet on the second port.

As a consequence of the performance of this technique using the new ERP identifier, a sub-ring that connects a node to a major ring will be logically broken apart in the topology. When RPL owner port blocking is subsequently performed, the loop that previously persisted within the major ring-sub-ring combination will no longer exist.

Avoiding Disconnections Produced by RPL Owner Port Blocking

Figure 12:
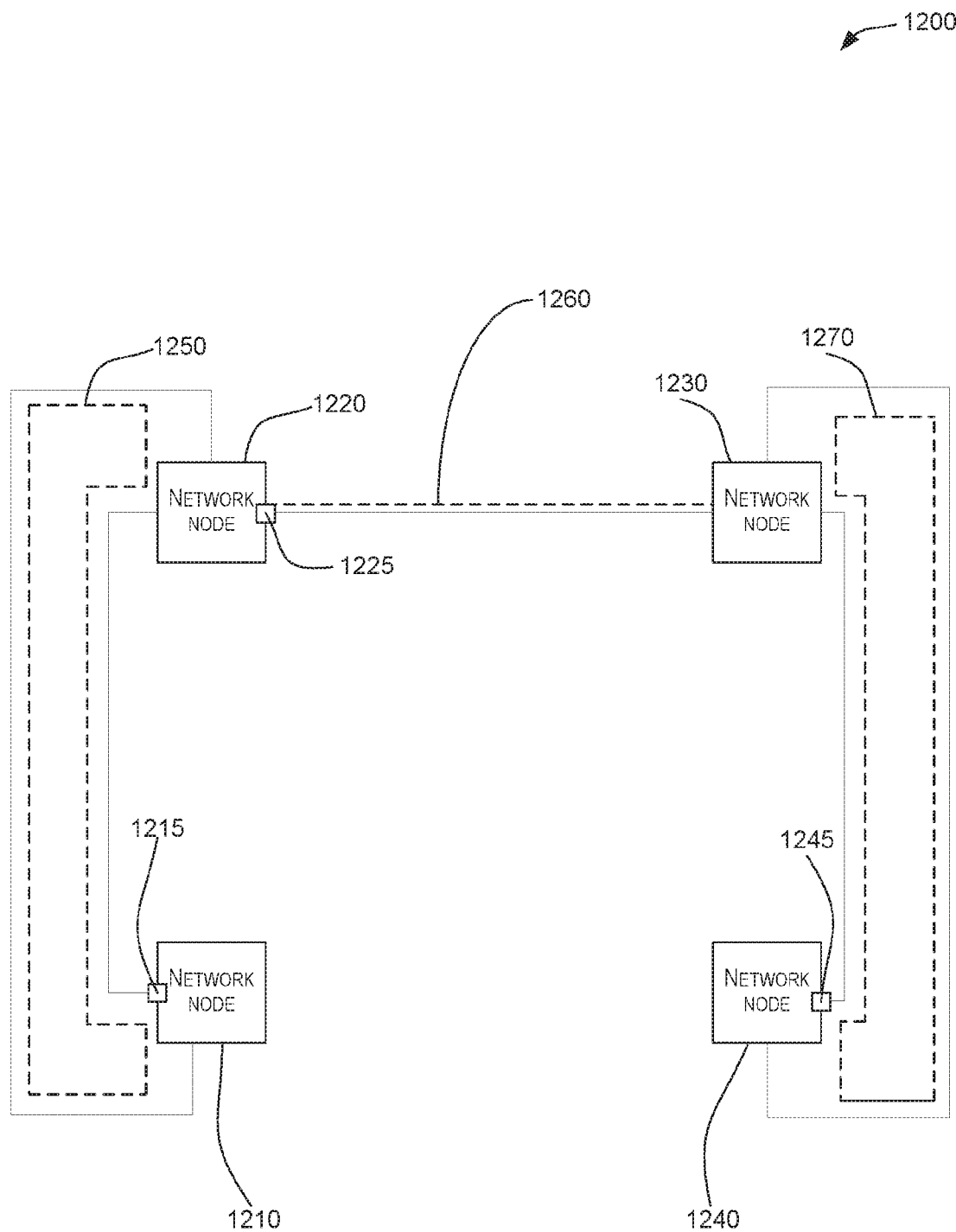
FIG. 12 is a network diagram that illustrates an example of a VLAN topology that includes a cut path.

As used herein, a "cut path" is a series of end-to-end node-interconnected network links that includes at least one "subnetwork-connecting" link through which all data traffic flowing from one subnetwork of the network to another subnetwork of the network must flow. If a port directly connected to such a subnetwork-connecting link were to be blocked as a part of the RPL owner port blocking process, then the network would be severed into the constituent subnetworks, which would then be disconnected from each other. If such a cut path were to be configured automatically as a sub-ring due to the performance of the technique discussed above in connection with FIG. 7, then this deleterious disconnection could occur. FIG. 12 is a network diagram that illustrates an example of a VLAN topology 1200 that includes a cut path. In topology 1200, nodes 1210 and 1220 are involved in a major ring 1250, nodes 1230 and 1240 are involved in a major ring 1270, and a subnetwork-connecting link 1260 is the only link that connects nodes 1220 and 1230. If RPL owner ports 1215 (for node 1210), 1225 (for node 1220), and 1245 (for node 1240) were to be blocked, then nodes 1210 and 1220 would be disconnected (specifically by the blockage of RPL owner port 1225) from nodes 1230 and 1240. Therefore, in an embodiment of the invention, MRCIP includes a technique in which cut paths previously configured as sub-rings are automatically identified and are responsively and automatically re-configured to be non-rings instead. In an embodiment, such non-rings do not possess any specific ring configuration (e.g., such as the kind that is performed relative to a ring as a part of the operation of ERP).

Figure 13:
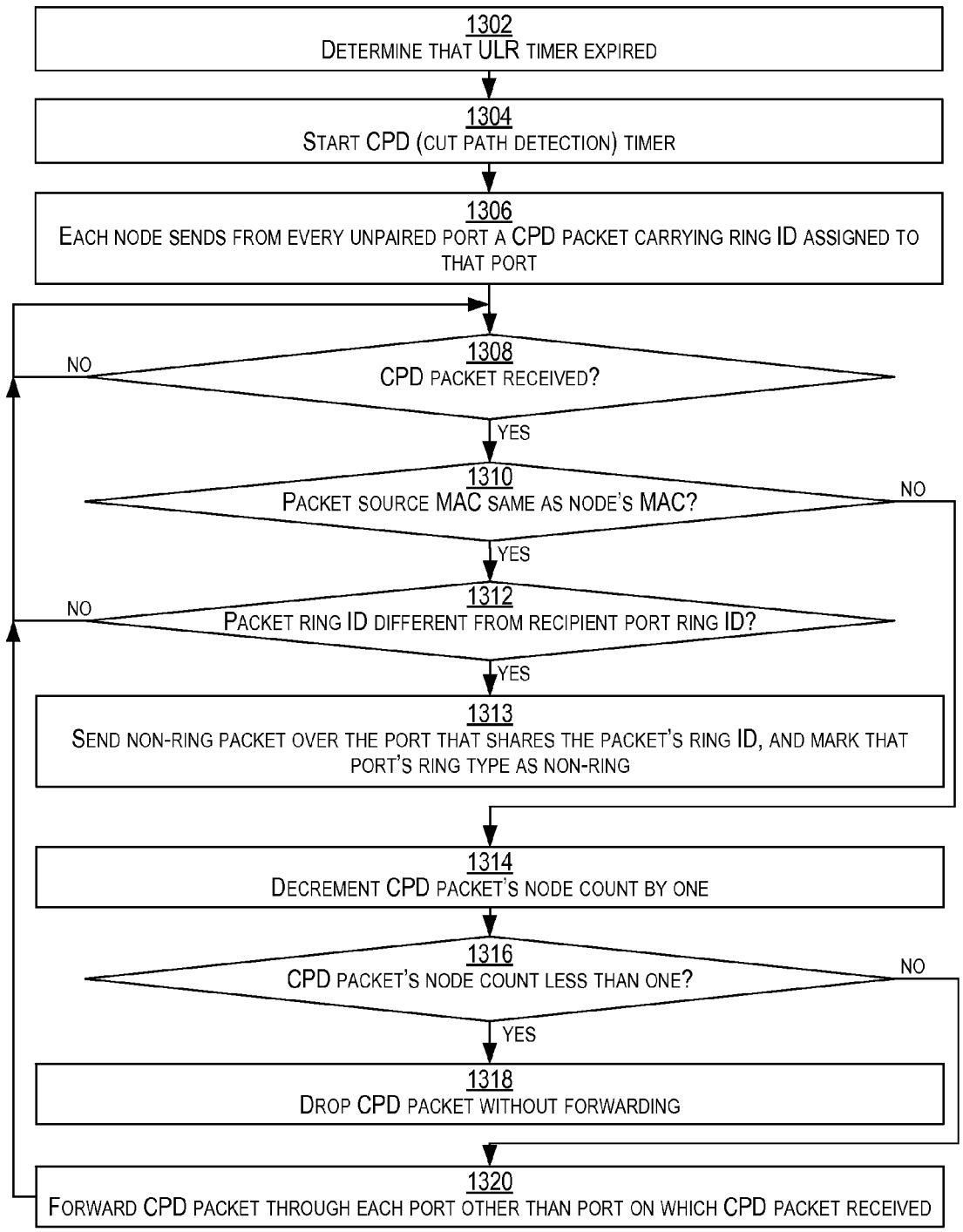
FIG. 13 is a flow diagram that illustrates a technique for automatically discovering cut paths that have been configured as sub-rings and for automatically reconfiguring such sub-rings to become non-rings, according to an embodiment of the invention.

FIG. 13 is a flow diagram that illustrates a technique for automatically discovering cut paths that have been configured as sub-rings and for automatically reconfiguring such sub-rings to become non-rings, according to an embodiment of the invention. In an embodiment of the invention, this technique can be performed after the RPL owner port selection performed as part of MRCIP phase two (as described above in connection with block 114 of FIG. 1) but prior to the RPL owner port blocking performed as part of ERP (as described above in connection with block 118 of FIG. 1). Initially, in block 1302, a node can determine that the ULR timer has expired. In block 1304, a cut-path detection timer, having a specified expiration value, can be started. In block 1306, each node can send, from every unpaired port, an MRICP packet having "CUT_PATH_DETECTION" as its opcode. Such an MRICP packet having such an opcode is referred to herein as a "CPD packet." Each CPD packet can carry a ring ID that is assigned to the port from which that CPD packet is sent. In block 1308, a node can determine whether it has received a CPD packet. If so, then control passes to block 1310. Otherwise, control passes back to block 1308. In block 1310, the node can determine whether the packet's source MAC is the same as the node's MAC. If so, then control passes to block 1312. Otherwise, control passes to block 1314. In block 1312, the node can determine whether the packet's ring ID is different from the recipient port's ring ID. If so, then control passes to block 1313. Otherwise, control passes back to block 1308. In block 1313, the node can send a non-ring packet over the port that shared the packet's ring ID, and can mark that port's ring type as "non-ring." The non-ring packet can be an MRICP packet having "NON_RING" as its opcode. In an embodiment, nodes that receive such an MRICP packet responsively refrain from participating in the ERP ring configuration process.

Alternatively, in block 1314, the node can modify the CPD packet by decrementing the CPD packet's node count by one. In block 1316, the node can determine whether the CPD packet's node count is less than one. If so, then control passes to block 1318. Otherwise, control passes to block 1320.

In block 1318, the node can drop the CPD packet without forwarding that CPD packet. The node may yet receive other CPD packets. Control passes back to block 1308.

Alternatively, in block 1320, the node can forward the CPD packet through each of the node's ports other than the port on which the node received the CPD packet. Control then passes back to block 1308.

In an embodiment of the invention, the technique discussed in connection with FIG. 13 can be performed after the performance of the techniques discussed in connection with FIGS. 9 and 11. In one embodiment, the techniques of FIGS. 9 and 11 terminate after the expiry of one or more timers (e.g., the ULR timer) that are started when the performances of those techniques begin. In one embodiment, the performance of the technique of FIG. 13 can commence sometime after the termination of the techniques of FIGS. 9 and 11.

Separate Ring Configuration Per Virtual Local Area Network (VLAN)

Techniques discussed above can associate a network node's ports with various ERP ring identifiers in preparation for the ERP configuration of all of the nodes in the network. In one embodiment of the invention, each network node can be associated with multiple separate VLANs. In such an embodiment, each network node can maintain a separate ERP ring identifier table for each separate VLAN with which that network node is associated, and the techniques discussed above can be performed separately and independently with regard to each separate VLAN. Each such ERP ring identifier table can indicate, for each of the network node's ports, the ERP ring identifier that is associated with that port (as a result of the performance of the techniques discussed above).

Thus, a particular port of a particular network node actually can be associated with multiple separate ERP ring identifiers, each one pertaining to a separate one of the VLANs to which the particular network node belongs. For example, for a first VLAN, a first port of the network node can be associated with a first ring identifier, but for a second VLAN, the first port of the network node can be associated with a second ring identifier that differs from the first ring identifier. Continuing the example, for the first VLAN, a second port of the network node can be associated with a third ring identifier, but for the second VLAN, the second port of the network node can be associated with a fourth ring identifier that differs from the third ring identifier. The techniques described above can be performed separately and independently per each VLAN, updating only the ERP ring identifier tables that pertain to that VLAN.

Automatic Ring Configuration

As is discussed above in connection with FIG. 1, MRICP can involve two major phases: phase one, in which rings in a VLAN are detected, and phase two, in which the detected rings are automatically configured, preparatory for the application of ERP. Block 110 of FIG. 1 illustrates an overview of the activities that can be performed during MRICP phase two. Embodiments of the automatic ring configuration that can be performed in MRICP phase two are now discussed in greater detail. In one embodiment, the performance of such automatic ring configuration can commence upon the expiration of one or more timers started at the beginning of the performance of the cut path detection technique discussed above in connection with FIG. 13.

Figure 14A:
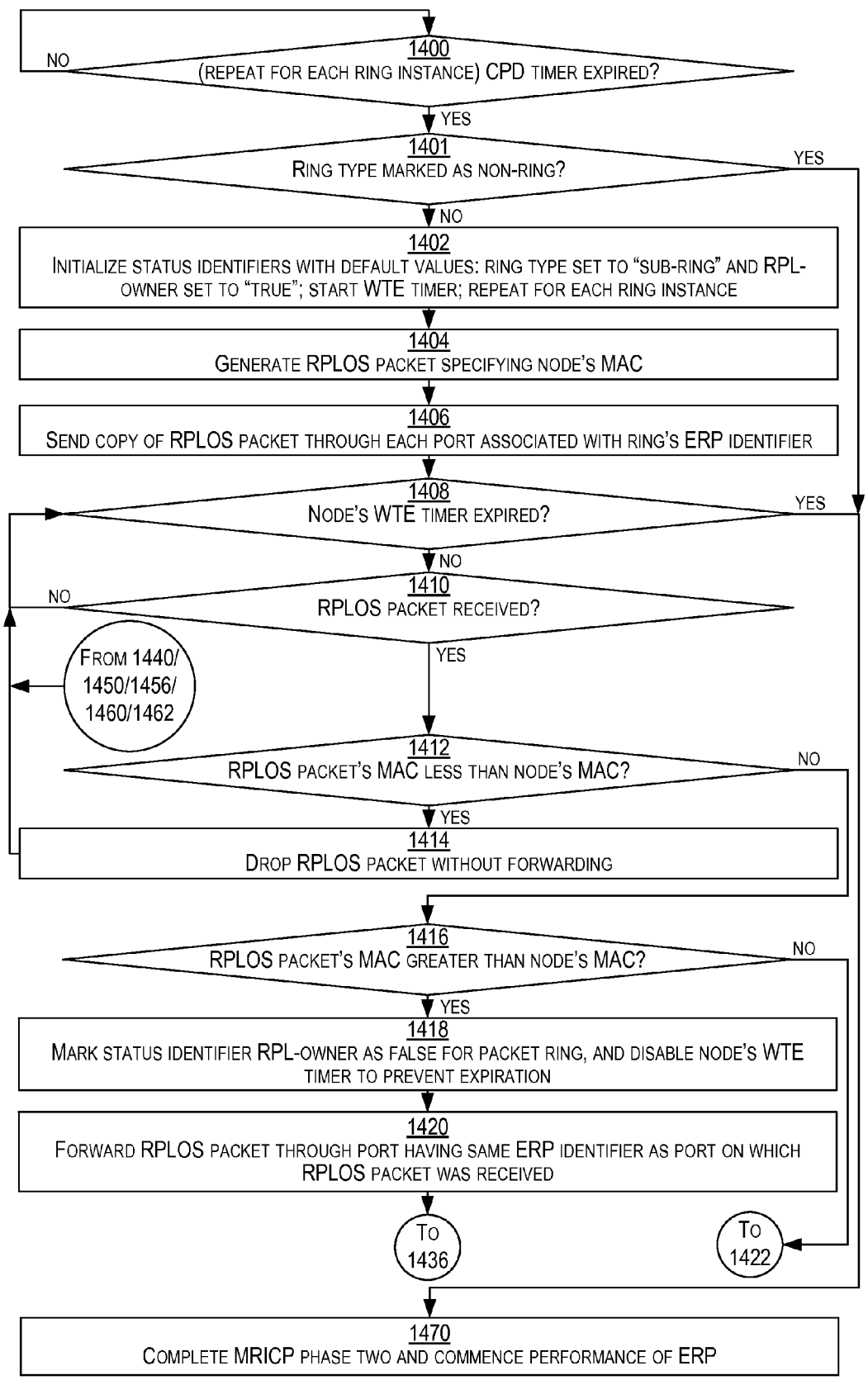
FIGS. 14A-14C show a flow diagram that illustrates a technique for automatically appointing particular nodes within rings as RPL owners, for appointing a certain port of each RPL owner as an RPL port, and for loading ERP configurations on each node, according to an embodiment of the invention.
Figure 14B:
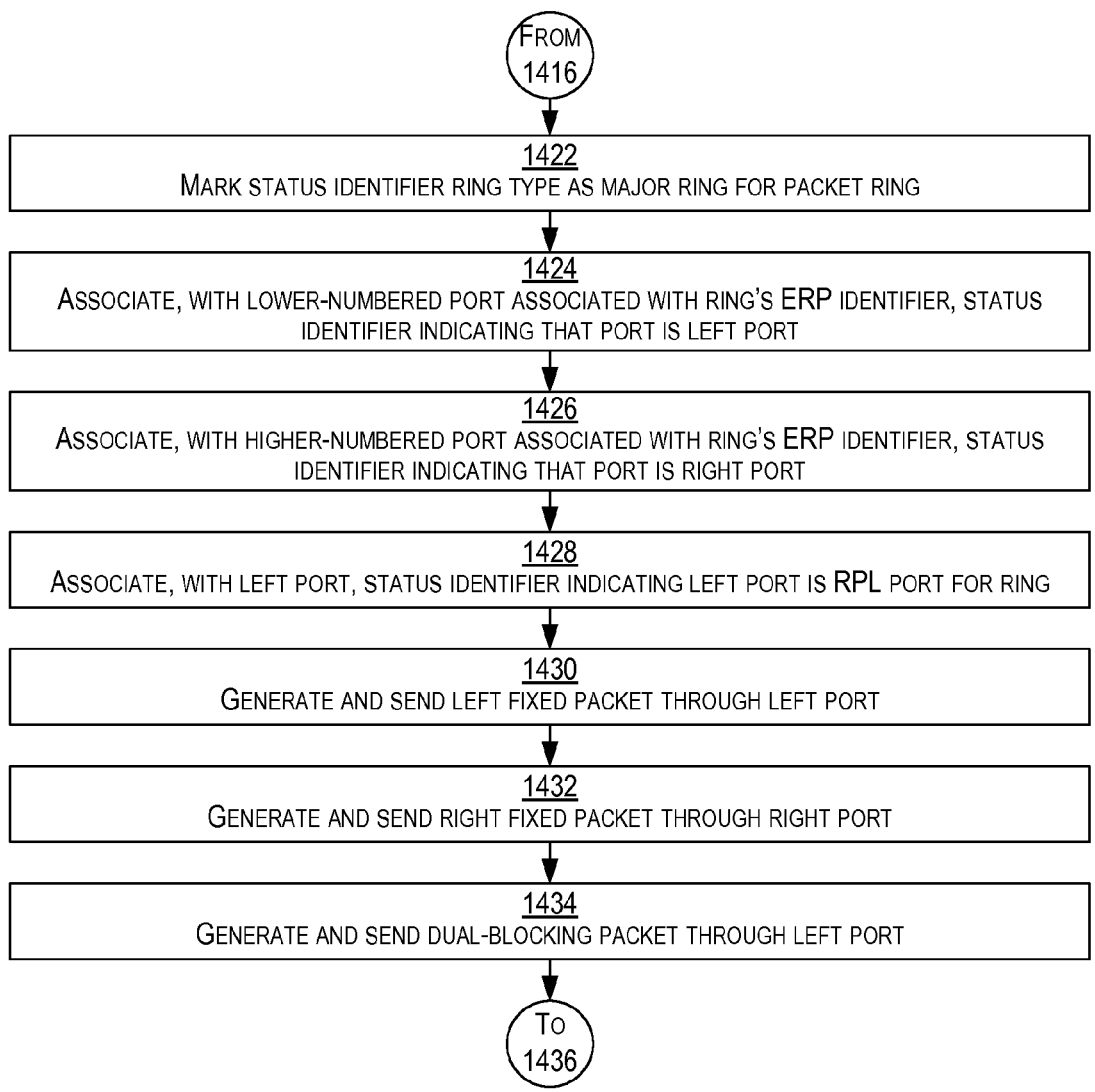
Figure 14C:
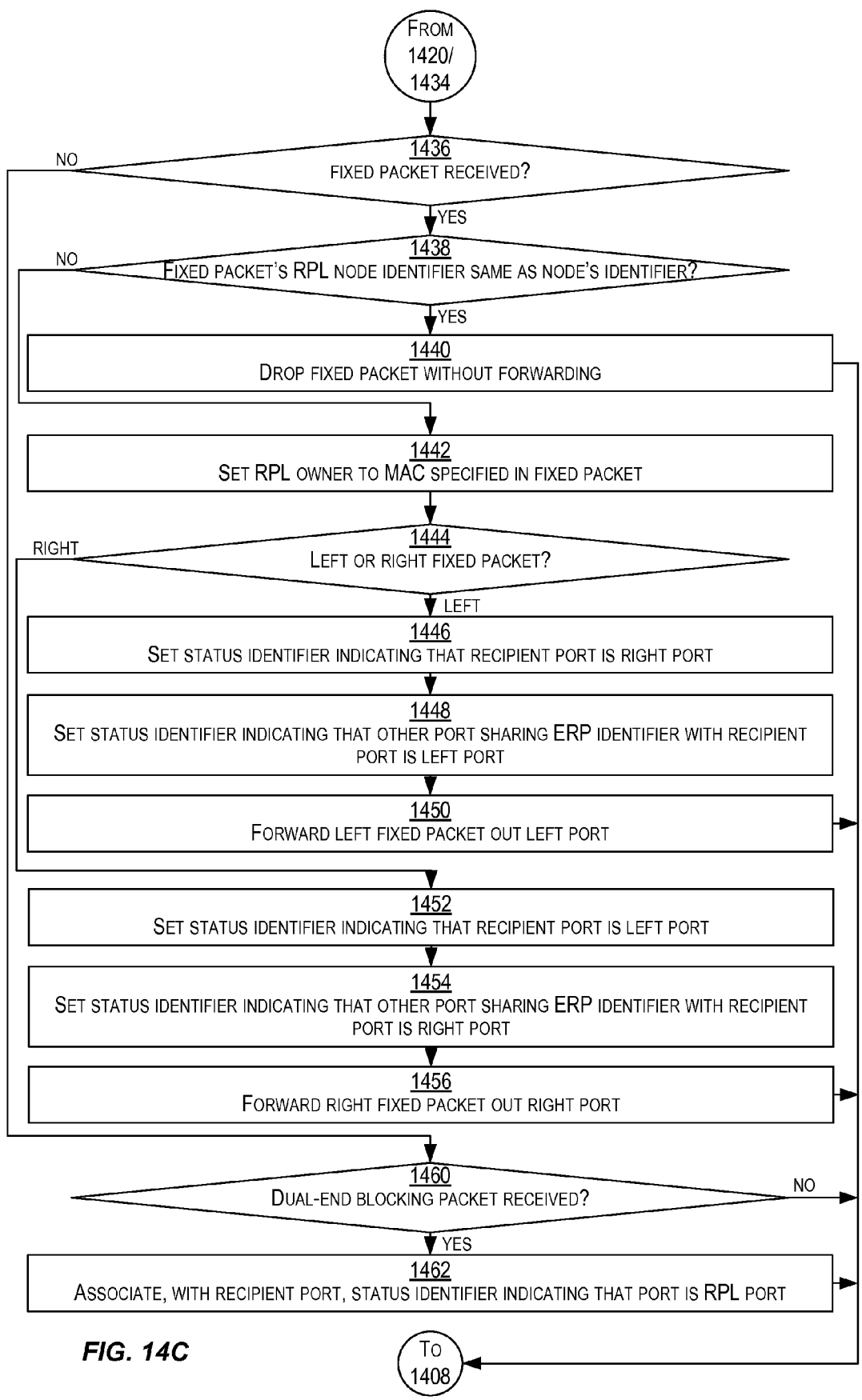

FIGS. 14A-14C show a flow diagram that illustrates a technique for automatically appointing particular nodes within rings as RPL owners, for appointing a certain port of each RPL owner as an RPL port, and for loading ERP configurations on each node, according to an embodiment of the invention. The technique discussed in connection with FIG. 14 can be performed independently and concurrently by each network node in the VLAN.

Referring first to FIG. 14A, in block 1400, for each ring instance, a determination can be made whether a CPD timer has expired. If any CPD timer has expired, then control passes to block 1401. Otherwise, control passes back to block 1400. In block 1401, a determination can be made whether a ring type of the ring instance for which the CPD timer expired is marked as a non-ring. If so, the control passes to block 1470. Otherwise, control passes to block 1402. In block 1402, status identifiers can be initialized with default values: ring-types can be set to "sub-ring" and RPL-owner can be set to "true." Additionally, a "wait till enable" (WTE) timer can be started. The operations of block 1402 can be repeated for each ring instance. In block 1404, a node can generate an MRICP packet specifying the node's MAC and having "RPL_OWNER_SELECTION" as the MRICP packet's opcode. In the following discussion, each packet having such an opcode is referred to as an "RPLOS packet." In block 1406, the node can send a copy of the RPLOS packet through each of that node's ports that are associated with the ERP ring identifier of the ring to which the node belongs.

In block 1408, the node can determine whether the node's WTE timer has expired. If so, then control passes to block 1470. Otherwise, control passes to block 1410.

In block 1410, the node can determine whether an RPLOS packet has been received on any of its ports. If so, then control passes to block 1412. Otherwise, control passes back to block 1408.

In block 1412, the node can determine whether the MAC specified in the RPLOS packet is less than the node's own MAC. If the MAC specified in the RPLOS packet is lower than the node's own MAC, then control passes to block 1414. Otherwise, control passes to block 1416.

In block 1414, the node drops the RPLOS packet that the node most recently received as of block 1410. Under such circumstances, the node does not forward the RPLOS packet. Control passes back to block 1408.

Alternatively, in block 1416, the node can determine whether the MAC specified in the RPLOS packet is greater than the node's own MAC. If the MAC specified in the RPLOS packet is greater than the node's own MAC, then control passes to block 1418. Otherwise, the MAC specified in the RPLOS packet is the node's own MAC, and the node has received back the RPLOS packet that it sent out through another port in block 1406. Under such circumstances, control passes to block 1422 of FIG. 14B.

In block 1418, the node can mark a status identifier RPL-owner as false for the packet ring, and can disable its WTE timer, so that its WTE timer will not expire. Under these circumstances, some other node in the ring has a higher MAC than this node, and so this node will not be selected as the RPL owner for the ring. In block 1420, the node can forward the RPLOS packet out through its other port (if any) that has the same ERP ring identifier as the port on which the node received that RPLOS packet. Control passes to block 1436 of FIG. 14C.

Alternatively, in block 1470, the node having the expired WTE timer can complete MRICP phase two and commence performance of ERP relative to the nodes that have been prepared using the technique described above in connection with FIG. 14. ERP can utilize the RPL owner information, RPL port information, and left and right port designations in order to configure each node in the VLAN so that only the nodes within a ring containing a failed link will need to re-learn paths upon the failure of that link.

Referring now to FIG. 14B, alternatively, in block 1422, the node can store a status identifier ring type as "major ring" for the packet ring. In block 1424, the RPL owner node can associate, with one of its ports associated with the ERP ring identifier of the ring to which the node belongs (e.g., the lower numbered of such ports), a status identifier that indicates that the port is the "left port." In block 1426, the RPL owner node can associate, with the other of its ports associated with the ERP ring identifier of the ring to which the node belongs (e.g., the higher numbered of such ports), a status identifier that indicates that the port is the "right port." In block 1428, the RPL owner node can associate, with its port designated as the "left port," a status identifier that indicates that the port is an RPL port for the ring. In one embodiment, each RPL port of each ring in the VLAN eventually will be blocked during the ERP configuration following MRICP phase two. In block 1430, the RPL owner node can generate and send, through its left port, a "left" fixed packet instructing recipients to designate the ports on which that "left" fixed packet is received to be "right ports." The "left" fixed packet also can contain information specifying the identity of the node that is the RPL owner. In block 1432, the RPL owner node can generate and send, through its right port, a "right" fixed packet instructing recipients to designate the ports on which that "right" fixed packet is received to be "left ports." The "right" fixed packet also can contain information specifying the identity of the node that is the RPL owner. For example, such information can be the RPL owner node's MAC. In block 1434, the RPL owner node can generate and send, through its left port, a dual-end blocking packet that instructs the recipient node to associate, with the port on which the dual-end blocking packet is received, a status that indicates that the port is an RPL port for the ring. Control passes to block 1436 of FIG. 14C.

Referring now to FIG. 14C, in block 1436, the node can determine whether a fixed packet (left or right) has been received on any of its ports. If so, then control passes to block 1438. Otherwise, control passes to block 1460.

In block 1438, the node can determine whether an RPL node identifier specified in the fixed packet matches the node's own identifier. For example, the node can determine whether an RPL node MAC specified in the fixed packet is the node's own MAC. If the RPL node identifier specified in the fixed packet matches the node's own identifier, then control passes to block 1440. Otherwise, control passes to block 1442.

In block 1440, the RPL node can drop the fixed packet without forwarding the fixed packet. Control passes back to block 1408 of FIG. 14A.

Alternatively, in block 1442, the node can set an RPL owner field for the ring to the MAC specified in the fixed packet. In block 1444, the node can determine whether the fixed packed is a left fixed packet or a right fixed packet. If the fixed packet is a left fixed packet, then control passes to block 1446. If the fixed packet is a right fixed packet, then control passes to block 1452.

In block 1446, the node can set a status identifier associated with the port on which the left fixed packet was received indicating that the port is a "right port." In block 1448, the node can set a status identifier associated with another port having a same ERP ring identifier as the port on which the left fixed packet was received indicating that this other port is the "left port." In block 1450, the node can forward the left fixed packet out through the left port. Control passes back to block 1408 of FIG. 14A.

Alternatively, in block 1452, the node can set a status identifier associated with the port on which the right fixed packet was received indicating that the port is a "left port." In block 1454, the node can set a status identifier associated with another port having a same ERP ring identifier as the port on which the right fixed packet was received indicating that this other port is the "right port." In block 1456, the node can forward the right fixed packet out through the right port. Control passes back to block 1408 of FIG. 14A.

In block 1460, the node can determine whether a dual-end blocking packet has been received on any of its ports. If so, then control passes to block 1462. Otherwise, control passes back to block 1408 of FIG. 14A.

In block 1462, the node can associate, with the port on which the dual-end blocking packet was received, a status identifier that indicates that the port is an RPL port for the ring. In one embodiment, each RPL port of each ring in the VLAN eventually will be blocked during the ERP configuration following MRICP phase two. The association of the RPL port status identifier with this second port of this second node will ensure that both ends of the link connected to the RPL owner's RPL port will be blocked. In an embodiment, the node does not forward the dual-end blocking packet. Control passes back to block 1408 of FIG. 14A.

Automatic Ring Identification and ERP Configuration in 2 Seconds

Figure 17:
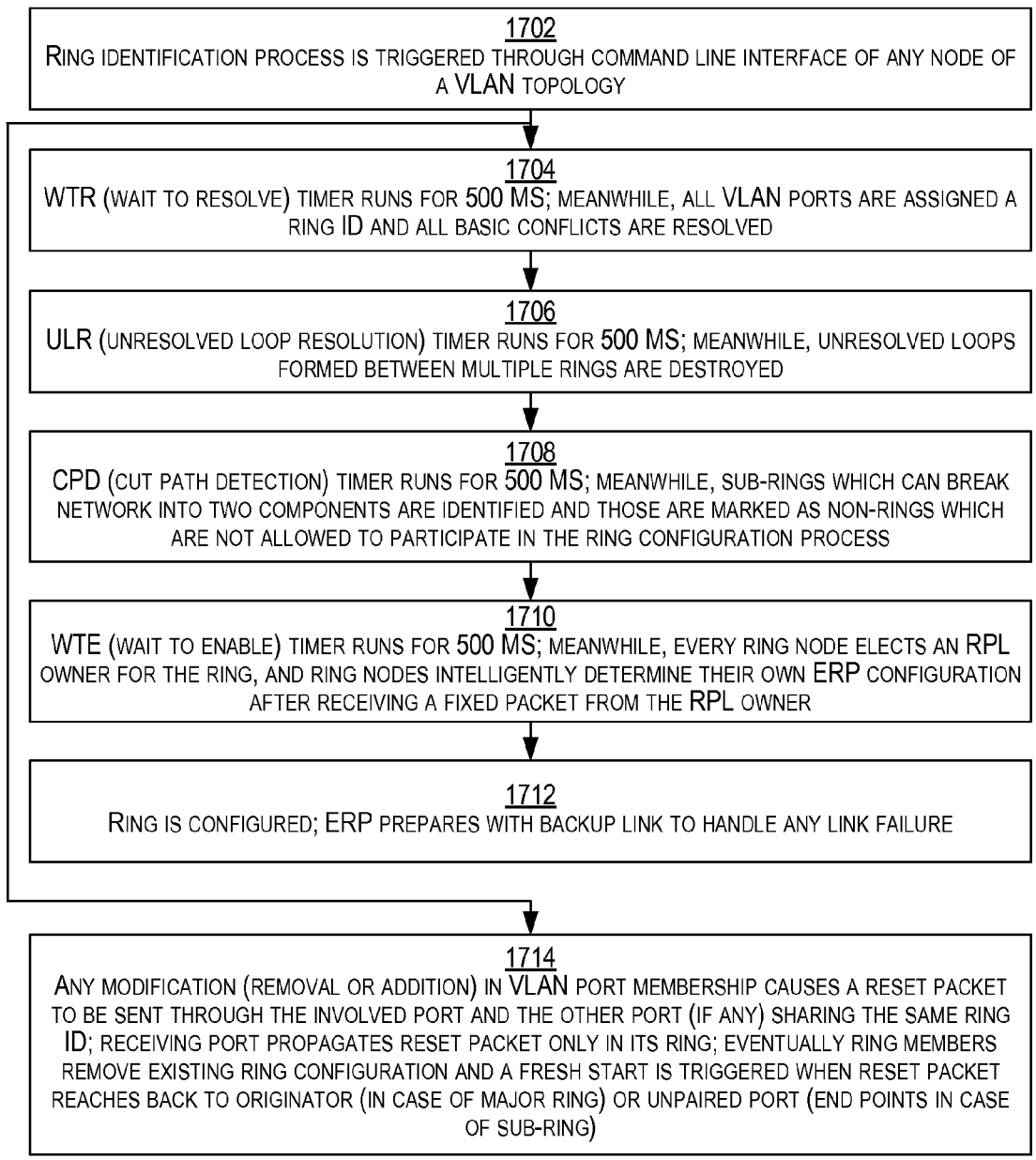
FIG. 17 is a flow diagram that illustrates a technique for achieving automatic ring identification and ERP configuration within 2 seconds.

FIG. 17 is a flow diagram that illustrates a technique for achieving automatic ring identification and ERP configuration within 2 seconds. In block 1702, the ring identification process is triggered through a command line interface of any node of a VLAN topology. Control passes concurrently to blocks 1704 and 1714. In block 1704, a WTR (wait to resolve) timer runs for 500 MS. Meanwhile, all VLAN ports are assigned a ring ID and all basic conflicts are resolved. In block 1706, an ULR (unresolved loop resolution) timer runs for 500 MS. Meanwhile, unresolved loops formed between multiple rings are destroyed. In block 1708, a CPD (cut path detection) timer runs for 500 MS. Meanwhile, sub-rings which can break the network into two components are identified and those are marked as non-rings which are not allowed to participate in the ring configuration process. In block 1710, a WTE (wait to enable) timer runs for 500 MS. Meanwhile, every ring node elects an RPL owner for the ring, and ring nodes intelligently determine their own ERP configuration after receiving a fixed packet from the RPL owner. In block 1712, the ring has been configured. ERP prepares with a backup link to handle any link failure. In block 1714, any modification (removal or addition) in VLAN port membership causes a reset packet to be sent through the involved port and the other port (if any) sharing the same ring ID. The receiving port propagates the reset packet only in its ring. Eventually, ring members remove the existing ring configuration and a fresh start is triggered when the reset packet reaches back to its originator (in case of major ring) or unpaired port (end points in case of sub-ring).

Example Network Node

Figure 15:
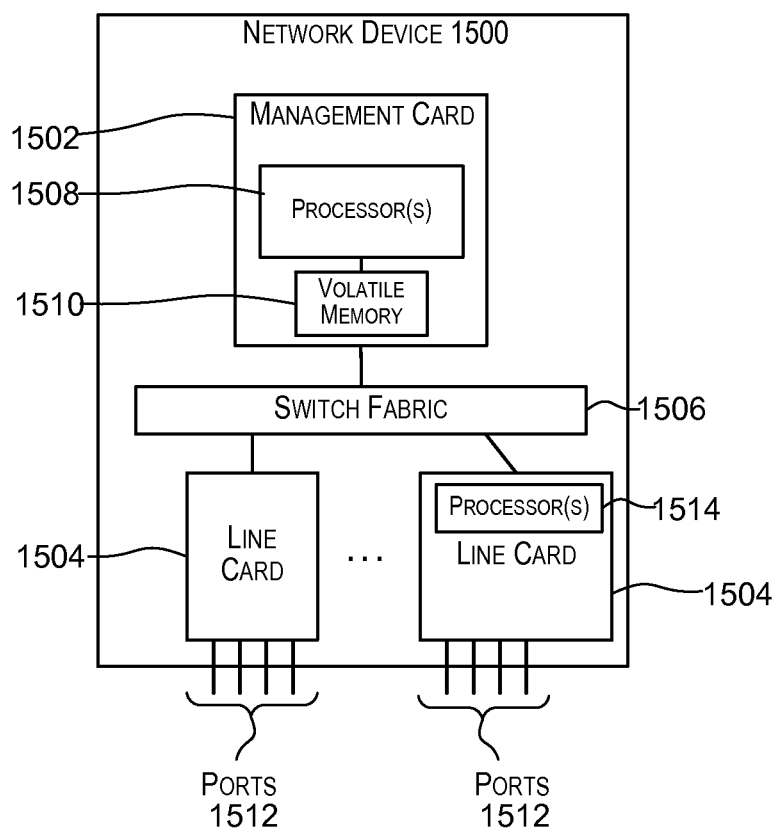
FIG. 15 depicts a simplified block diagram of a network device that may incorporate an embodiment of the present invention.
Figure 16:
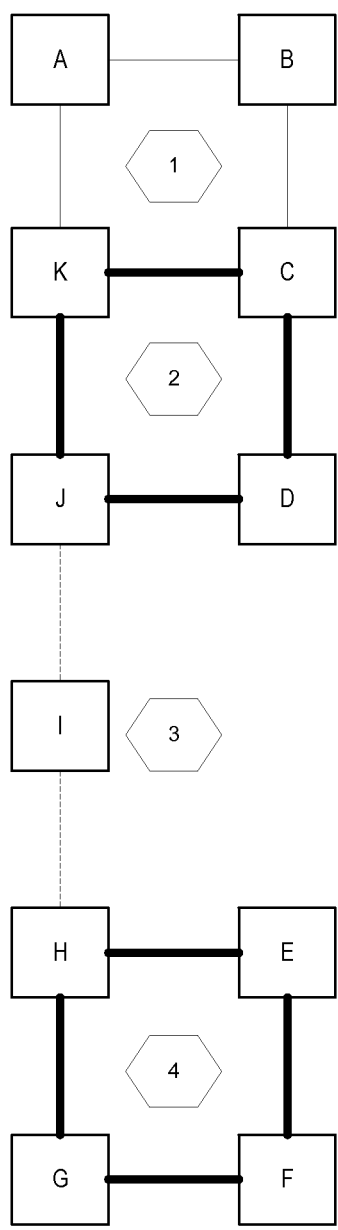
FIG. 16 is a block diagram that illustrates different ring types to which various embodiments of the invention can be applied.

Various different systems and devices may incorporate an embodiment of the present invention. FIG. 15 provides an example of a network device that may incorporate an embodiment of the present invention. FIG. 15 depicts a simplified block diagram of a network device 1500 that may incorporate an embodiment of the present invention (e.g., network device 1500 may correspond to nodes depicted in figures above). In the embodiment depicted in FIG. 15, network device 1500 comprises a plurality of ports 1512 for receiving and forwarding data packets and multiple cards that are configured to perform processing to facilitate forwarding of the data packets to their intended destinations. The multiple cards may include one or more line cards 1504 and a management card 1502. In one embodiment, a card, sometimes also referred to as a blade or module, can be inserted into one of a plurality of slots on the chassis of network device 1500. This modular design allows for flexible configurations with different combinations of cards in the various slots of the device according to differing network topologies and switching requirements. The components of network device 1500 depicted in FIG. 15 are meant for illustrative purposes only and are not intended to limit the scope of the invention in any manner. Alternative embodiments may have more or less components than those shown in FIG. 15.

Ports 1512 represent the I/O plane for network device 1500. Network device 1500 is configured to receive and forward packets using ports 1512. A port within ports 1512 may be classified as an input port or an output port depending upon whether network device 1500 receives or transmits a data packet using the port. A port over which a packet is received by network device 1500 is referred to as an input port. A port used for communicating or forwarding a packet from network device 1500 is referred to as an output port. A particular port may function both as an input port and an output port. A port may be connected by a link or interface to a neighboring network device or network. Ports 1512 may be capable of receiving and/or transmitting different types of traffic at different speeds including 1 Gigabit/sec, 15 Gigabits/sec, 150 Gigabits/sec, or even more. In some embodiments, multiple ports of network device 1500 may be logically grouped into one or more trunks.

Upon receiving a data packet via an input port, network device 1500 is configured to determine an output port of device 1500 to be used for transmitting the data packet from network device 1500 to facilitate communication of the packet to its intended destination. Within network device 1500, the packet is forwarded from the input port to the determined output port and then transmitted from network device 1500 using the output port. In one embodiment, forwarding of packets from an input port to an output port is performed by one or more line cards 1504. Line cards 1504 represent the data forwarding plane of network device 1500. Each line card may comprise one or more packet processors that are programmed to perform forwarding of data packets from an input port to an output port. In one embodiment, processing performed by a line card may comprise extracting information from a received packet, performing lookups using the extracted information to determine an output port for the packet such that the packet can be forwarded to its intended destination, and to forward the packet to the output port. The extracted information may include, for example, the header of the received packet.

Management card 1502 is configured to perform management and control functions for network device 1500 and represents the management plane for network device 1500. In one embodiment, management card 1502 is communicatively coupled to line cards 1504 via switch fabric 1506. Management card 1502 may comprise one or more physical processors 1508, one or more of which may be multicore processors. These management card processors may be general purpose multicore microprocessors such as ones provided by Intel, AMD, ARM, Freescale Semiconductor, Inc., and the like, that operate under the control of software stored in associated memory 1510. The processors may run one or more VMs. Resources allocated to these VMs may be dynamically changed. In some embodiments, multiple management cards may be provided for redundancy and to increase availability.

In some embodiments, one or more line cards 1504 may each comprise one or more physical processors 1514, some of which may be multicore. These processors may run one or more VMs. Resources allocated to these VMs may be dynamically changed.

The embodiment depicted in FIG. 15 depicts a chassis-based system. This however is not intended to be limiting. Certain embodiments of the present invention may also be embodied in non-chassis based network devices, which are sometimes referred to as "pizza boxes." Such a network device may comprise a single physical multicore CPU or multiple physical multicore CPUs.

Various embodiments described above can be realized using any combination of dedicated components and/or programmable processors and/or other programmable devices. The various embodiments may be implemented only in hardware, or only in software, or using combinations thereof. For example, the software may be in the form of instructions, programs, etc. stored in a computer-readable memory and may be executed by one or more processing units, where the processing unit is a processor, a core of a processor, or a percentage of a core. In certain embodiments, the various processing described above, including the processing depicted in the flowcharts described above can be performed in software without needing changes to existing device hardware (e.g., router hardware), thereby increasing the economic viability of the solution. Since certain inventive embodiments can be implemented entirely in software, it allows for quick rollouts or turnarounds along with lesser capital investment, which further increases the economic viability and attractiveness of the solution.

The various processes described herein can be implemented on the same processor or different processors in any combination, with each processor having one or more cores. Accordingly, where components or modules are described as being adapted to or configured to perform a certain operation, such configuration can be accomplished, e.g., by designing electronic circuits to perform the operation, by programming programmable electronic circuits (such as microprocessors) to perform the operation, by providing software or code instructions that are executable by the component or module (e.g., one or more processors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

The various embodiments are not restricted to operation within certain specific data processing environments, but are free to operate within a plurality of data processing environments. Additionally, although embodiments have been described using a particular series of transactions, this is not intended to be limiting.

Thus, although specific invention embodiments have been described, these are not intended to be limiting. Various modifications and equivalents are within the scope of the following claims. The contents of U.S. Provisional Patent Application No. 61/697,211, filed Sep. 5, 2012, and titled "MAC FLUSH OPTIMIZATIONS FOR ETHERNET RINGS," are incorporated by reference herein.

What is claimed is:

1. A network device, comprising:
one or more processors;
a plurality of ports including a first port and second port;
a memory coupled with and readable by the one or more processors;
wherein at least one processor from the one or more processors is configured to:
receive a first packet over the first port and a second packet over the second port, wherein the first packet is a packet for discovering a ring network and the second packet is a packet for assigning a particular numeric node identifier, wherein the ring network is formed by a plurality of network devices including the network device;
assign the particular numeric node identifier included in the second packet to each of the first port and the second port, the particular numeric node identifier identifying the ring network; and
transmit the second packet through the first port.

2. The network device of claim 1, wherein the first packet includes a first numeric node identifier, wherein the particular numeric node identifier is greater than or equal to the first numeric node identifier.

3. The network device of claim 1, wherein at least one processor from the one or more processors is configured to, upon receiving a third packet over one of the first port or the second port, wherein the third packet is for assigning a third numeric node identifier, assign the third numeric node identifier to each of the first port and the second port.

4. The network device of claim 1, wherein at least one processor from the one or more processors is configured to, prior to receiving the first packet and the second packet, assign a numeric node identifier of zero to each of the first port and the second port.

5. A method comprising:
transmitting, by a network device, a first packet including a first numeric node identifier over a first port of the network device;
transmitting, by the network device, a second packet including a second numeric node identifier over a second port of the network device;
upon receiving, over the first port, a first packet for assigning a particular numeric node identifier, assigning the particular numeric node identifier to each of the first port and the second port, the particular numeric node identifier identifying a ring network formed by a plurality of network devices including the network device;
upon receiving a second packet for assigning another numeric node identifier, determining that the other numeric node identifier is the same as the particular numeric node identifier; and
discarding the second packet.

6. The method of claim 5, further comprising, upon receiving a third packet for assigning a third numeric node identifier:
determining that the third numeric node identifier is greater than the particular numeric node identifier; and
assigning the third numeric node identifier to each of the first port and the second port.

7. A computer-readable storage memory storing a plurality of instructions executable by one or more processors, the plurality of instructions comprising:
instructions causing at least one processor from the one or more processors to receive a first packet over a first port of a network device and a second packet over a second port of the network device, wherein the first packet is a packet for discovering a ring network and the second packet is a packet for assigning a particular numeric node identifier, wherein the ring network is formed by a plurality of network devices including the network device;
instructions causing at least one processor from the one or more processors to assign the particular numeric node identifier included in the second packet to each of the first port and the second port, the particular numeric node identifier identifying the ring network; and
instructions causing at least one processor from the one or more processors to transmit the second packet through the first port.

8. A network device, comprising:
one or more processors;
a plurality of ports including a first port, second port, and a third port;
a memory coupled with and readable by the one or more processors;
wherein at least one processor from the one or more processors is configured to:
upon receiving a first packet over the first port and a second packet over the second port, assign a particular numeric node identifier included in the first packet or in the second packet to each of the first port and the second port, the particular numeric node identifier identifying a the ring network formed by a plurality of network devices including the network device; and
assign a second numeric node identifier to the third port, the second numeric node identifier identifying another ring network formed by another plurality of network devices including the network device.

9. The network device of claim 8, wherein the first packet and the second packet are each packets for discovering the ring network, and wherein at least one processor from the one or more processors is configured to transmit a third packet for assigning the particular numeric node identifier through the first port and a fourth packet for assigning the particular numeric node identifier through the second port.

10. The network device of claim 8, wherein at least one processor from the one or more processors is configured to, upon receiving a third packet over the third port, wherein the third packet is a packet for discovering the other ring network, the third packet including a third numeric node identifier:
determine that the third numeric node identifier is different than the particular numeric node identifier; and
transmit a fourth packet for assigning the third numeric node identifier over the third port.

11. The network device of claim 8, wherein at least one processor from the one or more processors is configured to, upon receiving a third packet over the third port, the third packet including the particular numeric node identifier, assign the third port a value of the particular numeric node identifier plus one.

12. The network device of claim 8, wherein at least one processor from the one or more processors is configured to, upon receiving a packet for assigning a third numeric node identifier over the first port, assign the third numeric node identifier to the first port.

13. The network device of claim 12, wherein at least one processor from the one or more processors is configured to transmit, over each of the first port and the third port, a packet for assigning the third numeric node identifier.

14. A computer-readable storage memory storing a plurality of instructions executable by one or more processors, the plurality of instructions comprising:
instructions causing at least one processor from the one or more processors to, upon receiving a first packet over a first port of a network device and a second packet over a second port of the network device, assign a particular numeric node identifier included in the first packet or in the second packet to each of the first port and the second port, the particular numeric node identifier identifying a ring network formed by a plurality of network devices including the network device; and
instructions causing at least one processor from the one or more processors to assign a second numeric node identifier to a third port of the network device, the second numeric node identifier identifying another ring network formed by another plurality of network devices including the network device.

15. A method comprising:
transmitting, by a network device, a first packet including a first numeric node identifier over a first port of the network device;
transmitting, by the network device, a second packet including a second numeric node identifier over a second port of the network device;
transmitting a third packet including a third numeric node identifier over a third port of the network device;
upon receiving, over the first port, a packet for assigning a particular numeric node identifier, assigning the particular numeric node identifier to each of the first port and the second port, the particular numeric node identifier identifying a ring network formed by a plurality of network devices including the network device; and
assigning a third numeric node identifier to the third port, the third numeric node identifier identifying another ring network formed by another plurality of network devices including the network device.

16. The method of claim 15, further comprising, upon receiving a third packet for assigning the particular numeric node identifier over the third port, assigning the third port a value of the particular numeric node identifier plus one.

17. The method of claim 15, further comprising, upon receiving a third packet for assigning the third numeric node identifier, wherein the third packet is received over the first port, assigning the third numeric node identifier to the first port.

18. The method of claim 15, further comprising, prior to transmitting the first packet or the second packet, assigning the first numeric node identifier to the first port and assigning the second numeric node identifier to the second port.

19. The method of claim 18, wherein the second numeric node identifier is equal to the first numeric node identifier plus one.

20. A method comprising:
assigning, by a network device, a first numeric node identifier to a first port of the network device;
assigning, by the network device, a second numeric node identifier to a second port of the network device, wherein the second numeric node identifier is equal to the first numeric node identifier plus one;
transmitting, by the network device, a first packet over the first port, the first packet including the first numeric node identifier;
transmitting, by the network device, a second packet over the second port, the second packet including the second numeric node identifier; and
upon receiving, over the first port, a packet for assigning a particular numeric node identifier, assigning the particular numeric node identifier to each of the first port and the second port, the particular numeric node identifier identifying a ring network formed by a plurality of network devices including the network device.

* * * * *

UNITED STATES PATENT AND TRADEMARK OFFICE
CERTIFICATE OF CORRECTION

PATENT NO. : 9,819,572 B2  
APPLICATION NO. : 14/832874  
DATED : November 14, 2017  
INVENTOR(S) : Mritiyunjay Kumar Singh Page 1 of 1

It is certified that error appears in the above-identified patent and that said Letters Patent is hereby corrected as shown below:

In the Claims

Column 20, Line 41: Delete "a the" and insert --a--.

Signed and Sealed this
Eighth Day of May, 2018

Andrei Iancu
*Director of the United States Patent and Trademark Office*